(12) United States Patent
Tahara

(10) Patent No.: US 11,836,165 B2
(45) Date of Patent: Dec. 5, 2023

(54) INFORMATION PROCESSING APPARATUS, CONTROL METHOD, AND PROGRAM INCLUDING DISPLAY OF PRIORITIZED INFORMATION

(71) Applicant: NEC CORPORATION, Tokyo (JP)

(72) Inventor: Yuji Tahara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 232 days.

(21) Appl. No.: 16/327,168

(22) PCT Filed: Jun. 7, 2017

(86) PCT No.: PCT/JP2017/021089
§ 371 (c)(1),
(2) Date: Feb. 21, 2019

(87) PCT Pub. No.: WO2018/037664
PCT Pub. Date: Mar. 1, 2018

(65) Prior Publication Data
US 2019/0236083 A1   Aug. 1, 2019

(30) Foreign Application Priority Data

Aug. 22, 2016  (JP) .................. 2016-161992

(51) Int. Cl.
*G06F 16/28* (2019.01)
*G06F 3/16* (2006.01)
(Continued)

(52) U.S. Cl.
CPC .......... *G06F 16/287* (2019.01); *G06F 3/0482* (2013.01); *G06F 3/16* (2013.01);
(Continued)

(58) Field of Classification Search
CPC ........ G06F 16/287; G06F 16/00; G06F 16/26; G06F 40/279; G06F 3/16; G06F 3/0482; G06Q 30/02
See application file for complete search history.

(56) References Cited

U.S. PATENT DOCUMENTS 7,308,421 B2 * 12/2007 Raghupathy ........... G06Q 20/20
                                                        705/16
7,552,395 B2 *  6/2009 Neale .................... G06F 16/332
                                                        707/999.005
(Continued)

FOREIGN PATENT DOCUMENTS

JP    2005-084829 A    3/2005
JP    2009-009170 A    1/2009
(Continued)

OTHER PUBLICATIONS

International Search Report of PCT/JP2017/021089 dated Aug. 22, 2017 [PCT/ISA/210].

*Primary Examiner* — Nicholas Klicos
(74) *Attorney, Agent, or Firm* — Sughrue Mion, PLLC

(57) ABSTRACT

A category determining unit (202) determines a category of a first layer and a category of a second layer related to an input keyword by using category information and the keyword. The category information is information indicating hierarchical categories. The second layer is a hierarchy lower than the first layer. A first display control unit (204) causes a display device (10) to display information on each product belonging to the determined category of the first layer. Here, the first display control unit (204) displays information on a product belonging to the determined category of the second layer at a higher priority than information on the other product.

8 Claims, 28 Drawing Sheets

(51) Int. Cl.
*G06Q 30/02* (2023.01)
*G06F 3/0482* (2013.01)
*G06F 16/00* (2019.01)
*G06F 40/279* (2020.01)
*G06F 16/26* (2019.01)

(52) U.S. Cl.
CPC .............. *G06F 16/00* (2019.01); *G06F 16/26* (2019.01); *G06F 40/279* (2020.01); *G06Q 30/02* (2013.01)

(56) References Cited

U.S. PATENT DOCUMENTS

| | | | | |
|---|---|---|---|---|
| 9,202,242 | B2* | 12/2015 | Quek | G06Q 30/0603 |
| 9,652,541 | B1* | 5/2017 | Amacker | G06F 16/9535 |
| 9,830,630 | B2* | 11/2017 | Chen | G06Q 30/0631 |
| 10,043,109 | B1* | 8/2018 | Du | G06N 3/0454 |
| 10,706,450 | B1* | 7/2020 | Tavernier | G06F 16/9535 |
| 2003/0018659 | A1* | 1/2003 | Fuks | G06F 16/3325 |
| | | | | 715/230 |
| 2004/0220902 | A1* | 11/2004 | Gates | G06F 16/951 |
| 2007/0156651 | A1* | 7/2007 | Weigel | G06F 16/951 |
| | | | | 707/E17.084 |
| 2007/0226640 | A1* | 9/2007 | Holbrook | G06F 16/951 |
| | | | | 715/765 |
| 2009/0043762 | A1* | 2/2009 | Shiverick | G06F 16/2425 |
| 2009/0234834 | A1* | 9/2009 | Cozzi | G06F 16/9535 |
| 2010/0076952 | A1* | 3/2010 | Wang | G06F 16/951 |
| | | | | 707/706 |
| 2010/0281417 | A1* | 11/2010 | Yolleck | G06F 16/954 |
| | | | | 715/779 |
| 2011/0035403 | A1* | 2/2011 | Ismalon | G06F 16/242 |
| | | | | 707/769 |
| 2011/0320454 | A1* | 12/2011 | Hill | G06F 16/58 |
| | | | | 707/E17.046 |
| 2012/0016873 | A1* | 1/2012 | Mathieson | G06F 16/24578 |
| | | | | 707/723 |
| 2012/0233170 | A1* | 9/2012 | Musgrove | G06Q 20/04 |
| | | | | 707/740 |
| 2013/0018729 | A1* | 1/2013 | Liu | G06Q 30/0277 |
| | | | | 705/14.54 |
| 2013/0166412 | A1* | 6/2013 | Greaves | G06Q 30/0619 |
| | | | | 705/26.62 |
| 2013/0339853 | A1* | 12/2013 | Hierons | G06F 16/634 |
| | | | | 715/716 |
| 2014/0067613 | A1* | 3/2014 | Singhal | G06Q 30/0603 |
| | | | | 705/26.62 |
| 2015/0066801 | A1* | 3/2015 | Wallace | G06F 16/951 |
| | | | | 705/342 |
| 2015/0154312 | A1* | 6/2015 | Tilwani | G06Q 10/087 |
| | | | | 707/715 |
| 2015/0154534 | A1* | 6/2015 | Tilwani | G06Q 10/087 |
| | | | | 705/28 |
| 2016/0055564 | A1* | 2/2016 | Achuthan | G06F 16/538 |
| | | | | 705/26.62 |
| 2016/0253744 | A1* | 9/2016 | Masuko | G06F 3/0484 |
| | | | | 715/762 |
| 2016/0266738 | A1* | 9/2016 | Martello | G06F 40/177 |
| 2016/0335693 | A1* | 11/2016 | Lin | G06F 16/90324 |
| 2017/0116658 | A1* | 4/2017 | Baid | G06Q 30/0625 |
| 2017/0249686 | A1* | 8/2017 | Chen | G06F 16/287 |
| 2017/0270577 | A1* | 9/2017 | Fazal Mahamood | G06F 16/33 |
| 2017/0308552 | A1* | 10/2017 | Soni | G06F 16/54 |

FOREIGN PATENT DOCUMENTS

| | | |
|---|---|---|
| JP | 2009-301266 A | 12/2009 |
| JP | 2010-205224 A | 9/2010 |
| JP | 2014-521170 A | 8/2014 |

* cited by examiner

FIG. 6

| CATEGORY | CATEGORY DIRECTLY BELOW | DEPTH |
|---|---|---|
| FOOD | CONFECTIONERY, DRINK ··· | 1 |
| CONFECTIONERY | WESTERN CONFECTIONERY, JAPANESE CONFECTIONERY ··· | 2 |
| WESTERN CONFECTIONERY | CAKE, PUDDING ··· | 3 |
| CAKE | CUT CAKE, WHOLE CAKE ··· | 4 |
| CUT CAKE | MONT BLANC, SHORTCAKE ··· | 5 |
| MONT BLANC | — | 6 |
| ··· | ··· | ··· |

| CATEGORY | DEPTH 1 | DEPTH 2 | UPPER CATEGORY DEPTH 3 | DEPTH 4 | DEPTH 5 |
|---|---|---|---|---|---|
| FOOD | – | – | – | – | – |
| CONFECTIONERY | FOOD | – | – | – | – |
| WESTERN CONFECTIONERY | FOOD | CONFECTIONERY | – | – | – |
| CAKE | FOOD | CONFECTIONERY | WESTERN CONFECTIONERY | – | – |
| CUT CAKE | FOOD | CONFECTIONERY | WESTERN CONFECTIONERY | CAKE | – |
| MONT BLANC | FOOD | CONFECTIONERY | WESTERN CONFECTIONERY | CAKE | CUT CAKE |
| ... | ... | ... | ... | ... | ... |

PRODUCT INFORMATION 504

| PRODUCT ID 502 | PRODUCT NAME | PRICE | LAST DISPLAY DATE AND TIME | ... | CATEGORY 506 |
|---|---|---|---|---|---|
| I001 | CHESTNUT MONT BLANC | 324 | 2016/7/11 10:25 | ... | MONT BLANC |
| I002 | STRAWBERRY SHORTCAKE | 298 | 2016/7/11 10:50 | ... | SHORTCAKE |
| ... | ... | ... | ... | ... | ... |

INFORMATION PROCESSING APPARATUS, CONTROL METHOD, AND PROGRAM INCLUDING DISPLAY OF PRIORITIZED INFORMATION

CROSS REFERENCE TO RELATED APPLICATIONS

This application is a National Stage of International Application No. PCT/JP2017/021089, filed Jun. 7, 2017, claiming priority to Japanese Patent Application No. 2016-161992, filed Aug. 22, 2016, the contents of all of which are incorporated herein by reference in their entirety.

TECHNICAL FIELD

The present invention relates to an information processing apparatus, a control method, and a program.

BACKGROUND ART

A system for searching for information has been developed. Patent Documents 1 and 2 are documents that disclose such a system. Patent Document 1 discloses a system that accepts a search target's keyword by voice, and displays a list of Uniform Resource Locators (URLs) of contents on the Internet as a result of the search. Patent Document 2 discloses a system that recognizes input voice to obtain a plurality of recognition candidates, and searches for information using the plurality of recognition candidates.

RELATED DOCUMENT

Patent Document

[Patent Document 1] Japanese Patent Application Publication No. 2009-9170
[Patent Document 2] Japanese Patent Application Publication No. 2005-84829

SUMMARY OF THE INVENTION

Technical Problem

In a system of searching for information on products, there are cases where the products are classified by hierarchical categories. For example, a hierarchical structure in which categories such as confectionery and drink are located under a category called food, and categories such as western confectionery and Japanese confectionery may be considered to be located under the confectionery.

The inventor of the present invention has found methods of providing information in a novel manner, in a system for searching for information on products classified by the hierarchical categories. Patent Documents 1 and 2 do not disclose a search for products classified by these hierarchical categories.

The present invention has been made in view of the problems. An object of the present invention is to provide information on the products classified by the hierarchical categories in a novel manner.

Solution to Problem

A first information processing apparatus according to the present invention includes: (1) a category determining unit that determines a category of a first layer and a category of a second layer related to a first keyword by using category information indicating hierarchical categories and the first keyword that is input; and (2) a first display control unit that causes a display device to display information on a product belonging to the determined category of the first layer,
  wherein the second layer is a layer lower than the first layer, and
  the first display control unit causes the display device to display information on a product belonging to the determined category of the second layer at a higher priority than information on the other product.

A second information processing apparatus according to the present invention includes: (1) a category determining unit that determines a category of a first layer related to a first keyword by using category information indicating hierarchical categories and the first keyword that is input; and (2) a display control unit that causes a display device to display specification information of the determined category of the first layer at a higher priority than other specification information which has been already displayed on the display device.

A first control method according to the present invention is executed by a computer.

The control method includes: (1) a category determining step of determining a category of a first layer and a category of a second layer related to a first keyword by using category information indicating hierarchical categories and the first keyword that is input; and (2) a first display control step of causing a display device to display information on a product belonging to the determined category of the first layer,
  wherein the second layer is a layer lower than the first layer, and
  in the first display control step, information on a product belonging to the determined category of the second layer is displayed on the display device at a higher priority than information on the other product.

A second control method according to the present invention is executed by a computer.

The control method includes: (1) a category determining step of determining a category of a first layer related to a first keyword by using category information indicating hierarchical categories and the first keyword that is input; (2) a display control step of causing a display device to display specification information of the determined category of the first layer at a higher priority than other specification information which has been already displayed on the display device.

A first program according to the present invention causes a computer to execute each step of the first control method of the present invention.

A second program according to the present invention causes a computer to execute each step of the second control method of the present invention.

Advantageous Effects of Invention

According to the present invention, there is provided a technique for providing information on the products classified by the hierarchical categories in a novel manner.

BRIEF DESCRIPTION OF THE DRAWINGS

The above objects and other objects, features and advantages will become more apparent from the following description of the preferable example embodiments and the accompanying drawings.

FIG. 6 is a diagram illustrating category information in a table format.

FIG. 7 is a diagram illustrating the category information in a format different from the category information on FIG. 6.

FIG. 8 is a diagram illustrating information on products in a table format.

DESCRIPTION OF EMBODIMENTS

Figure 1:
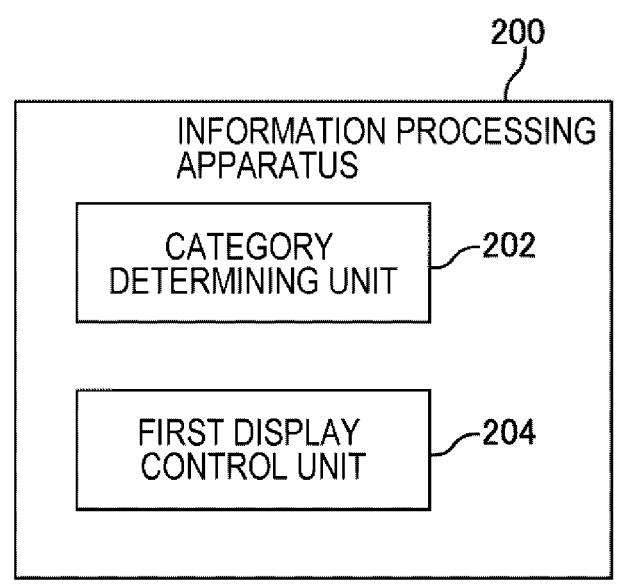
FIG. 1 is a block diagram illustrating an information processing apparatus according to a first example embodiment.

Hereinafter, example embodiments of the present invention will be described with reference to the drawings. In all the drawings, same components are denoted by the same reference numerals, and descriptions thereof is not repeated. In each of the block diagrams, unless otherwise described, each block does not represent a hardware unit, but a configuration of a functional unit.

First Example Embodiment

FIG. 1 is a block diagram illustrating the information processing apparatus 200 according to the first example embodiment. The information processing apparatus 200 includes a category determining unit 202 and a first display control unit 204.

Using the category information and an input keyword, the category determining unit 202 determines a category related to the keyword. The keyword is a certain character string. The category information is information indicating hierarchical categories. A category related to a keyword is, for example, a category that matches a keyword. The details of relations between keywords and categories will be described later.

Figure 2:
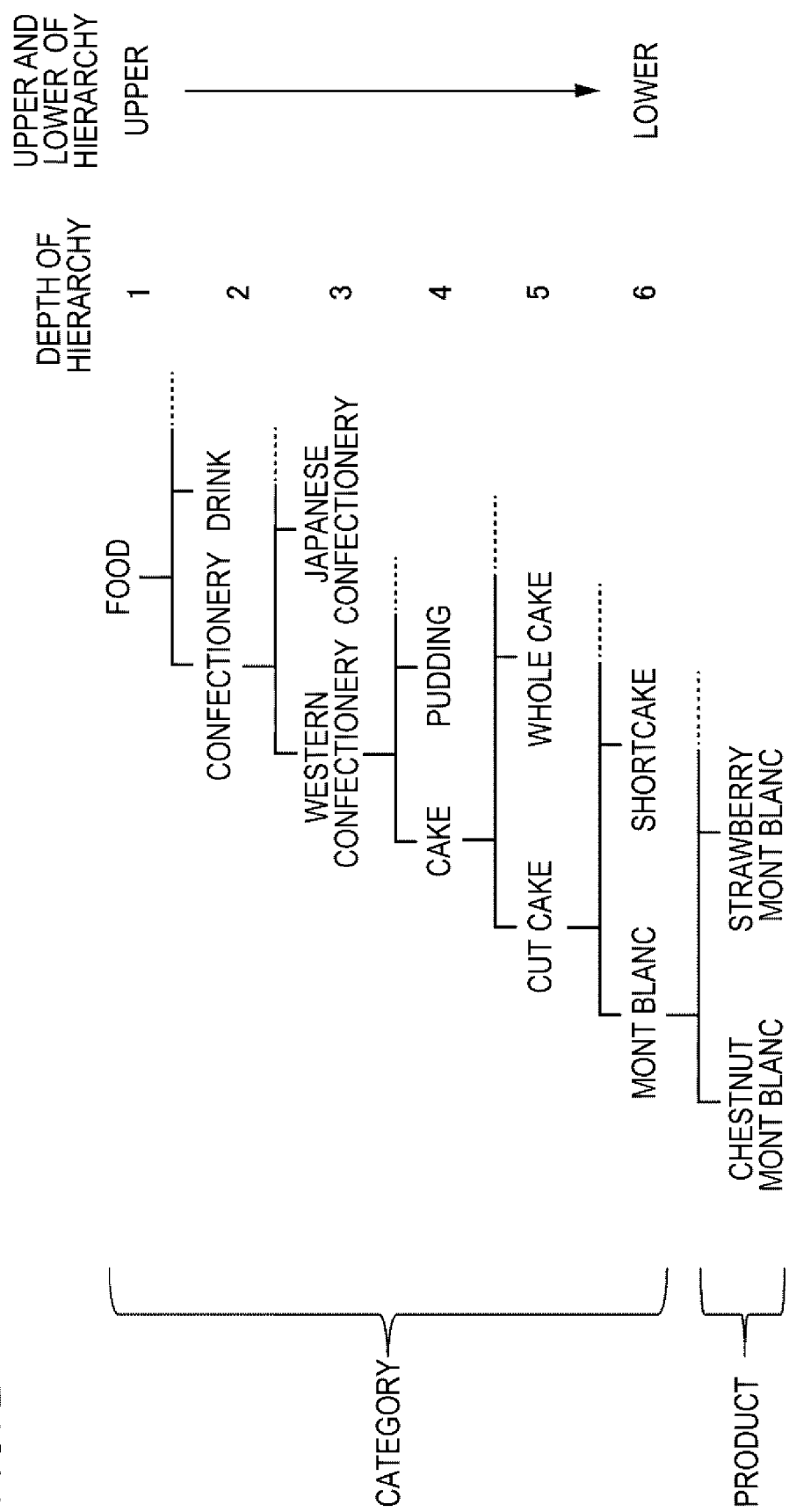
FIG. 2 is a diagram illustrating hierarchical categories.

FIG. 2 is a diagram illustrating hierarchical categories. In FIG. 2, for example, a category called cake belongs to a category called western confectionery. Also, the category called western confectionery belongs to a category called confectionery. Furthermore, the category called confectionery belongs to the category called food. Hereinafter, that a certain category A belongs to another category B is also denoted as that "the category A is located under the category B". For example, the category called cake is located wider the category called western confectionery.

A product belongs to each of a series of hierarchical categories as described above. Here, in FIG. 2, a lowest located chestnut Mont Blanc and a strawberry Mont Blanc represent products. For example, a product referred to as the "strawberry Mont Blanc" belongs to categories called food, confectionery, western confectionery, cake, cut cake, and Mont Blanc.

Here, the category determining unit 202 determines a category of a first layer and a category of a second layer as categories related to a keyword. The second layer is a layer lower than the first layer. For example, in FIG. 2, suppose that the first layer is a layer at a depth in which the cake and the pudding are located, and the second layer is a layer at another depth in which cut cakes and whole cakes are located. At this time, once the keyword "Mont Blanc" is input, the cake and the cut cake are respectively determined as the categories of the first layer and the category of the second layer related to the Mont Blanc. Note that, a specific method of determining a depth of layers represented by the first layer and second layer represent will be described later.

The first display control unit 204 causes the display device to display information on the products belonging to the category of the first layer, which is determined by the category determining unit 202. Further, the first display control unit 204 causes the display device to display information on the products belonging to the category of the second layer, which is determined by the category determining unit 202, at a higher priority than information on the other products. For example, in a case where information on products is displayed in a list, the first display control unit 204 causes information on the products with a higher priority to be displayed higher than information on products with a low priority. A specific method of controlling a display according to the priority will be described later.

Suppose that the cake and the cut cake are respectively determined as the category of the first layer and the category of the second layer due to the input of the keyword "Mont Blanc" in the example of FIG. 2, as described above. In this case, the first display control unit 204 causes the display device to display information on the products belonging to the category of the first layer called cake. Further, at that time, the first display control unit 204 causes the display device to display information on the products belonging to the category of the second layer called cut cake, at a higher priority than information on the other products. For example, the first display control unit 204 causes information on the products belonging to the category called cut cake to be displayed higher than information on the other products belonging to the category called cake in a list of information on products.

According to the information processing apparatus 200 of the example embodiment, information on products belonging to the category of the first layer related to the input keyword is displayed on a display device 10. Therefore, a user of the information processing apparatus 200 may easily recognize information on respective products that are classified by the hierarchical categories.

Furthermore, according to the information processing apparatus 200 of the example embodiment, information on products belonging to the category of the second layer related to the input keyword is displayed on the display device at a higher priority than information on the other products. Here, the category of the second layer is located wider the category of the first layer. Therefore, it could be said that, among the respective products belonging to the category of the first layer related to the keyword, the products belonging to the category of the second layer related to the keyword are products having a higher degree of relevance to the keyword than the other products.

Therefore, according to the information processing apparatus 200, a place where a product having a high degree of relevance to the keyword is displayed is able to be a place conforming to the intention of a designer, a user, or the like of the information processing apparatus 200. Thereby, information on the products is provided to the user of the information processing apparatus 200 such that information on the products having a high degree of relevance to the keyword may be more easily recognized.

For example, the information processing apparatus 200 may be used as a tool for a store clerk to serve a customer. For example, the information processing apparatus 200 acquires voices of a conversation between the store clerk and the customer, and extracts a keyword from the voice. The store clerk explores a request of the customer and provides a guide of recommended products by talking with the customer. Then, the information processing apparatus 200 may acquire a keyword in which the request of the customer or the recommendation of the store clerk indicates. As a result, information on products meeting the request of the customer or recommended by the store clerk is displayed on the display device.

Hereinafter, further details of this example embodiment will be described.

<Example of Hardware Implementing the Information Processing Apparatus 200>

Each function configuration unit of the information processing apparatus 200 may be implemented by hardware (for example, a hard-wired electronic circuit) implementing each function configuration unit, or a combination of hardware and software (for example, a combination of an electronic circuit and a program for controlling the electronic circuit, and the like).

Figure 3:
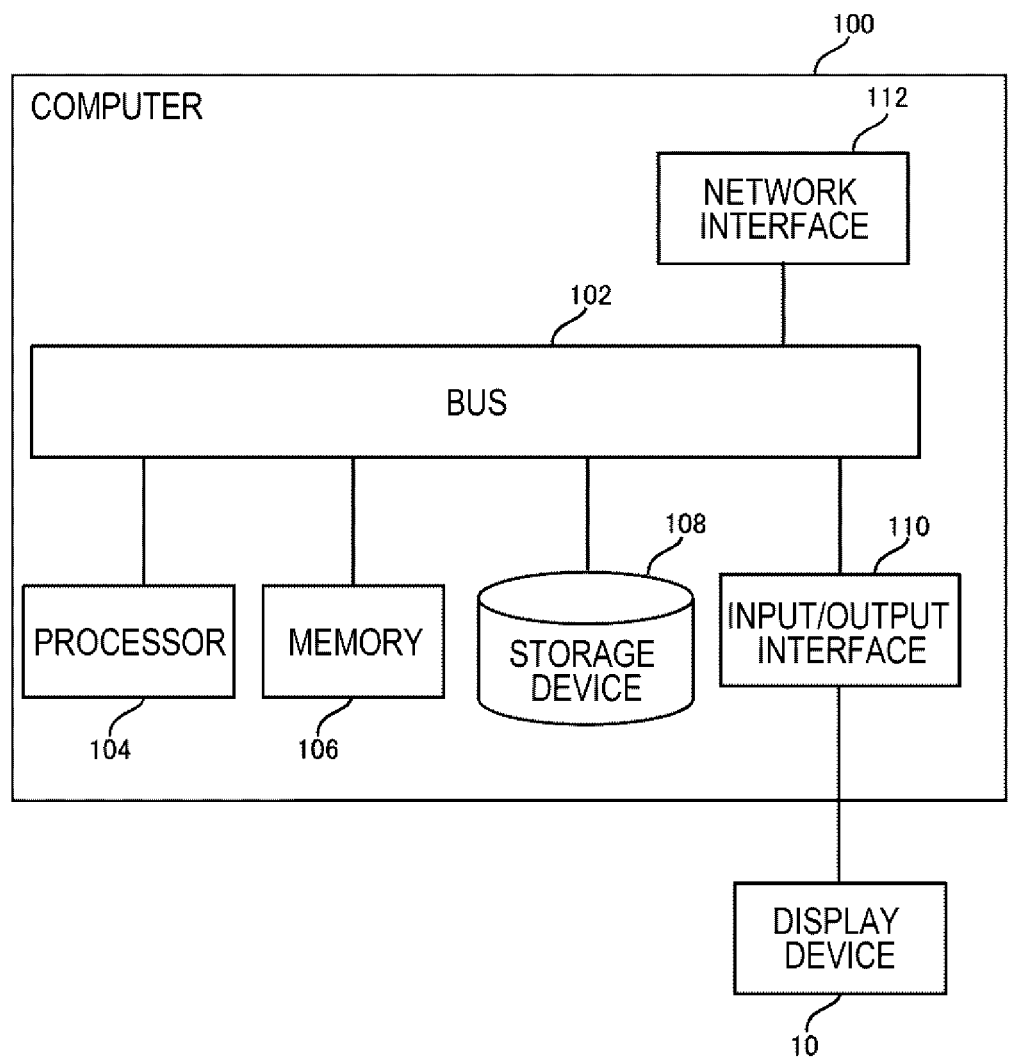
FIG. 3 is a diagram illustrating a computer for implementing the information processing apparatus.

FIG. 3 is a diagram illustrating a computer 100 for implementing the information processing apparatus 200. The computer 100 is a certain computer. For example, the computer 100 is a portable terminal such as a tablet terminal or a smartphone, a Personal Computer (PC), a server machine, or the like. The computer 100 may be a special-purpose computer designed to implement the information processing apparatus 200 or may be a general-purpose computer.

The computer 100 includes a bus 102, a processor 104, a memory 106, a storage device 108, an input/output interface 110, and a network interface 112. The bus 102 is a data transmission path through which the processor 104, the memory 106, the storage device 108, the input/output interface 110, and the network interface 112 mutually transmit and receive data. However, the method of connecting the processor 104 and the like with one another is not limited to a bus connection.

The processor 104 is an arithmetic processor such as a Central Processing Unit (CPU) or a Graphics Processing Unit (GPU). The memory 106 is a memory implemented by using a Random Access Memory (RAM) or the like. The storage device 108 is a storage device implemented by using a hard disk, a Solid State Drive (SSD), a Read Only Memory (ROM), a flash memory, or the like.

The input/output interface 110 is an interface for connecting the computer 100 to a peripheral device. In FIG. 3, the display device 10 is connected to the input/output interface 110. The display device 10 is a display device on which information on the products is displayed. For example, the display device 10 is a liquid crystal display or the like.

The network interface 112 is an interface for connecting the computer 100 to a communication network. A method for connecting the network interface 112 to the communication network may be a wireless connection or a wired connection.

The storage device 108 stores a program module for implementing each function of the information processing apparatus 200. The processor 104 implements each function of the information processing apparatus 200 by reading out the program module into the memory 106 and executing the program.

<Flow of Processing>

Figure 4:
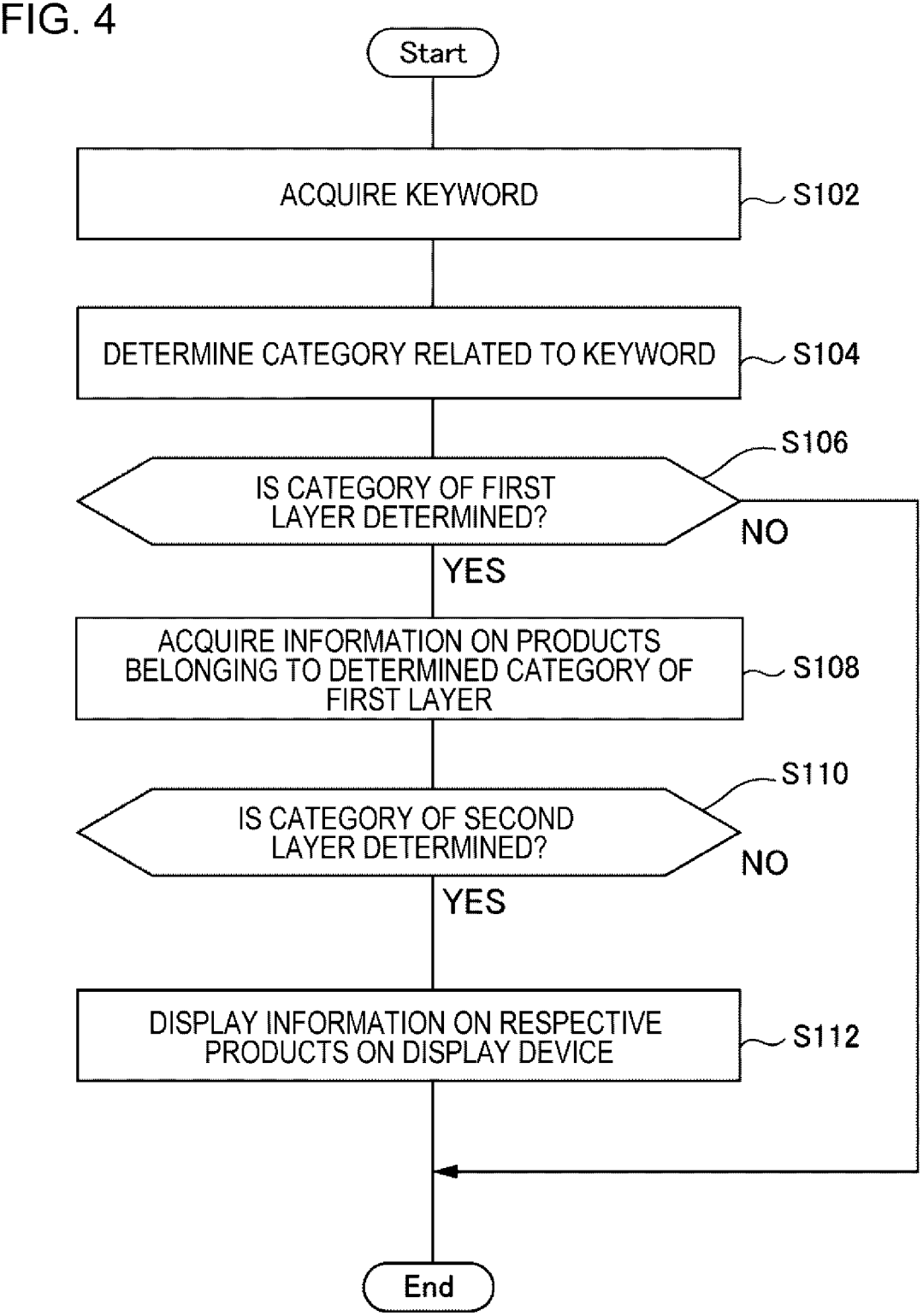
FIG. 4 is a flowchart illustrating a flow of processing executed by the information processing apparatus according to the first example embodiment.

FIG. 4 is a flowchart illustrating a flow of processing executed by the information processing apparatus 200 according to the first example embodiment. The information processing apparatus 200 acquires a keyword (S102). The category determining unit 202 determines a category related to the keyword by using category information and the keyword (S104). In S104, in a case where the category of the first layer is determined (S106: YES), the first display control unit 204 acquires information on the products belonging to the category of the first layer (S108). On the other hand, in a case where the category of the first layer is not determined in S104 (S106: NO), the processing of FIG. 4 is ended.

In a case where the category of the second layer is determined in S104 (S110: YES), the display device 10 is caused to display information on respective products acquired in S108 (S112). At this time, the first display control unit 204 causes the display device 10 to display information on the products belonging to the determined category of the second layer at a higher priority than information on the other products.

In a case where the category of the second layer is not determined in S104 (S110: NO), the processing of FIG. 4 is ended. However, in this case, the information processing apparatus 200 may cause the display device 10 to display information on the products acquired in S108 in a certain order.

<Acquiring of Keyword: S102>

The keyword is a character string input through various input devices. For example, the keyword is input by a voice input. In this case, an input device used for inputting the keyword is, for example, a microphone. Also, for example, the keyword is input by a key input. In this case, the input device used for inputting the keyword is, for example, a keyboard or a touch panel.

The input device used for inputting a keyword may be provided in the information processing apparatus 200, may be directly connected to the information processing apparatus 200, or may be connected to the information processing apparatus 200 through another apparatus. In the case where the input device is provided in the information processing apparatus 200 or is directly connected to the information processing apparatus 200, the information processing apparatus 200 acquires the keyword from the input device. Note that, in a case where the keyword is input by voice, the processing (voice recognition processing) of converting this voice into a character string is performed. This processing may be performed by the information processing apparatus 200, or may be performed by the input device.

In the case where the input device is connected to the information processing apparatus 200 through another apparatus, the information processing apparatus 200 acquires the keyword from the other apparatus. In a case where the keyword is input by voice, the processing of converting voice into a character string may be performed by the other apparatus, may be performed by the information processing apparatus 200, or may be performed by the input device.

Figure 5A:
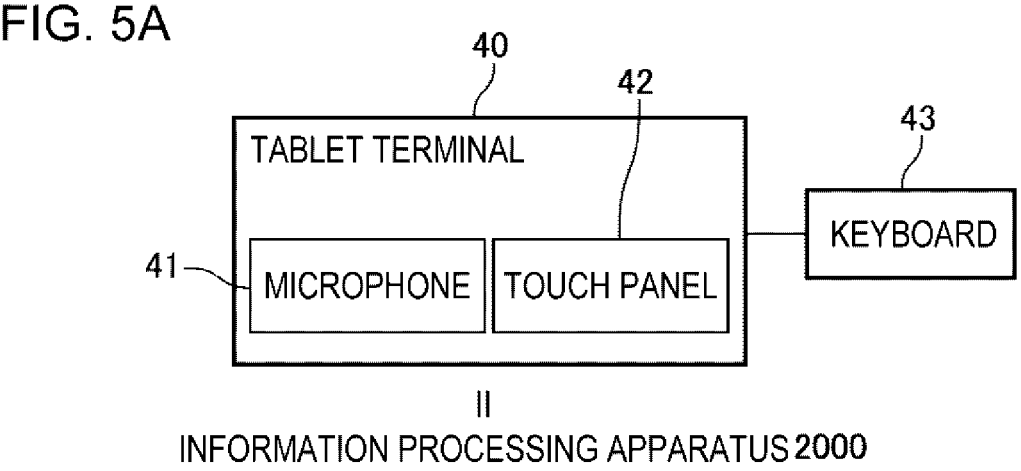
FIGS. 5A and 5B are diagrams illustrating a connection relationship between the information processing apparatus and an input device.
Figure 5B:
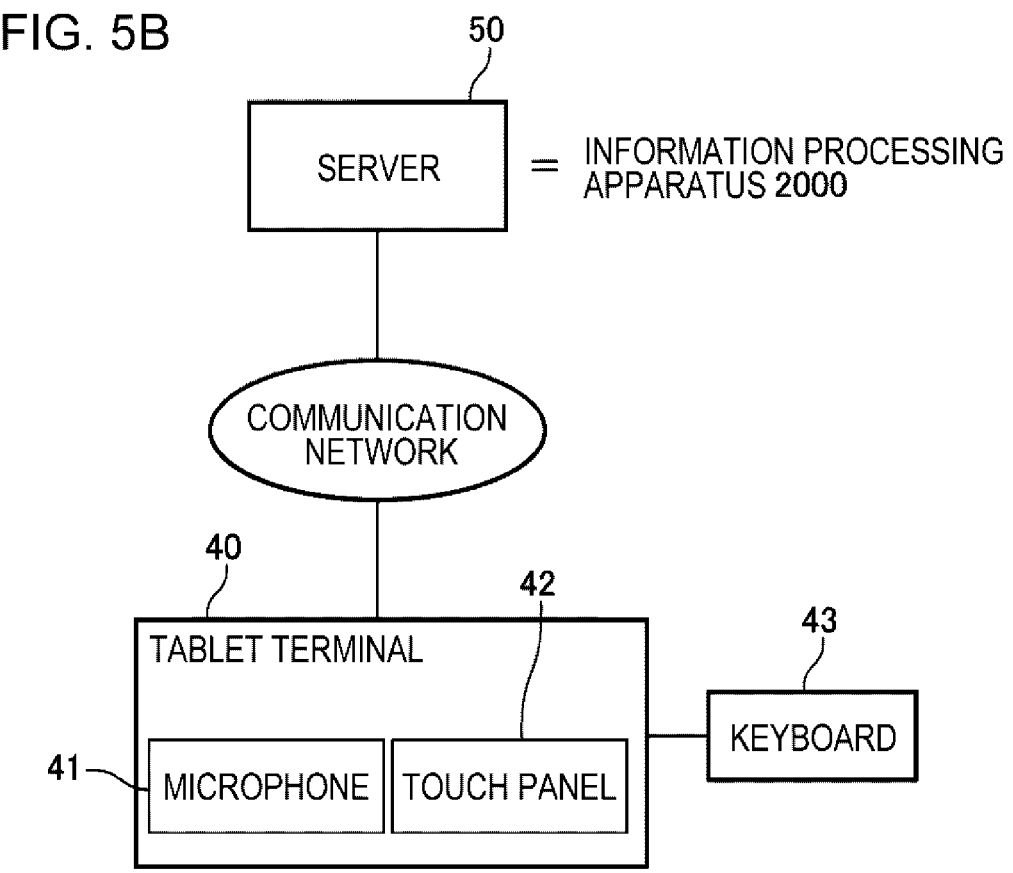

FIGS. 5A and 5B are diagrams illustrating a connection relationship between the information processing apparatus 200 and the input device. In the example of FIG. 5A, the information processing apparatus 200 is a tablet terminal 40 operated by the customer or the store clerk at a store. In this case, the input device is a microphone 41 provided in the tablet terminal 40, a touch panel 42, a keyboard 43, or the like connected to the tablet terminal 40. The information processing apparatus 200 acquires the character string input through these input devices as a keyword.

On the other hand, in the example of FIG. 5B, the information processing apparatus 200 is a server 50 connected to the tablet terminal 40 through a communication network. Therefore, the information processing apparatus 200 is connected to the input device through the tablet terminal 40. The tablet terminal 40 transmits a character string that is input through the microphone 41, the touch panel 42, the keyboard 43, or the like, to the server 50. The server 50 acquires this character string as a keyword.

For example, the tablet terminal 40 may be used as a tool for a store clerk to serve the customer. In this case, for example, the microphone 41 acquires a conversation between the customer and the store clerk as voice and extracts a keyword from the voice. Also, for example, the touch panel 42 or the keyboard 43 accepts a character input of a keyword by a customer or a store clerk.

<<About Character String to be Handled as Keyword>>

Among character strings that is input by the input device as a keyword, the information processing apparatus 200 may handle all the character strings as the keyword, or may handle only the character string satisfying a predetermined condition as the keyword. Hereinafter, the "character string satisfying a predetermined condition" will be described.

Suppose that the character string is generated by a key input. In this case, for example, the information processing apparatus 200 handles a character string that is input in a text box for a keyword input, as a keyword. A well-known technique may be used as a method of recognizing whether or not a character string is input in a predetermined text box.

Suppose that the character string is generated by a voice input. In this case, for example, the information processing apparatus 200 extracts a noun included in a character string (for example, a character string representing a sentence that a person has spoken) obtained by speech recognition, and handles the extracted noun as a keyword. A well-known technique may be used for a technique for extracting a noun included in a character string.

Note that, the processing of extracting a character string to be handled as a keyword, from the character string input by the input device, may be performed by the information processing apparatus 200, or may be performed by an apparatus other than the information processing apparatus 200.

<Determining of Category: S104>

The category determining unit 202 determines the category of the first layer and the category of the second layer related to the keyword, using the category information and the keyword (S104). FIG. 6 is a diagram illustrating category information in a table format. A table shown in FIG. 6 is called a category information table 400. The category information table 400 has three columns of a category 402, a category directly below 404, and a depth 406. Among categories belonging to the category indicated in the category 402, the category directly below 404 indicates categories located at a layer lower by one than that of the category indicated in the category 402. The depth 406 represents a depth in a hierarchy category. For example, since the category called food is the top category, the depth 406 is "1". Also, since the category called confectionery is a category of the second depth from the top, the depth 406 is "2". Note that, the category information table 400 in FIG. 6 represents a part of the hierarchy of categories shown in FIG. 2.

The category information table 400 may be stored inside the information processing apparatus 200 or may be externally stored. Hereinafter, the storage device that stores the category information table 400 is called category information storage device. The category information storage device is any storage device.

The category determining unit 202 determines the category related to the keyword by searching using the input keyword. Here, there are various methods for defining relations between keywords and categories. For example, a category related to a keyword is a category whose name matches the keyword.

In another example, a category related to a keyword is a category which includes the keyword as a part of the name. Note that, suppose that there are a plurality of categories which include the input keyword as part of the name. In this case, the category determining unit 202 may determine a plurality of categories as the category related to the keyword, or may determine a predetermined number (for example, one) category of the plurality of categories, as the category related to the keyword, in the latter case, for example, the category determining unit 202 computes a degree of match between the keyword and each category name. Then, the category determining unit 202 determines each category, in which a rank of the degree of match to the keyword falls within a predetermined number from the top, as the category related to the keyword.

Also, for example, in the category information, each category and one or more character strings (hereinafter, referred to as tags) representing the characteristics of the category may be related to each other, and the category related to the keyword may be determined based on the tags. In this case, the category related to the keyword is a category related to a tag matching the keyword or a category related to a tag that includes the keyword as a part of the tag in category information.

As described above, the tag is a character string representing the characteristic of the category. For example, the tag is a character string representing the characteristic common to products belonging to that category. For example, the tag related to the category called confectionery is a "sweets", or the like.

Also, for example, the tag may be a character string representing a situation where a product belonging to the category is used, or may be a character string representing words expected to be uttered by a customer who desires products belonging to the category. For example, the tag related to the category called eye drops is "eyes are tired" or "eyes are itchy". Also, for example, the tag related to the category called nutritious tonic is "tired", "sleepy", "busy with work", or the like.

Here, suppose that the category determined using the category information table 400 is a category lower than the category of the first layer or the category of the second layer. In this case, the category determining unit 202 determines upper categories to which the determined category belongs, using the category information table 400. Thereby, the category determining unit 202 determines the category of the first layer and the category of the second layer.

For example, suppose that, in a case where the category information is represented in the category information table 400 of FIG. 6, a keyword "Mont Blanc" is input. Also, suppose that the category of the first layer is the layer at the depth 4 and the category of second layer is the layer at the depth 5.

First, the category determining unit 202 determines the Mont Blanc as a category related to the keyword. The layer of the Mont Blanc is at the depth 6, which is lower than that of the second layer. Therefore, the category determining unit 202 further determines the category called cut cake to which the Mont Blanc belongs by searching the category information table 400 using the Mont Blanc. The layer of the cut cake is at the depth 5, which is the depth of the second layer. Therefore, the category determining unit 202 determines the cut cake as the category of the second layer related to the keyword.

Further, the category determining unit 202 determines the category called cake to which the cut cake belongs by searching the category information table 400 using the cut cake. The layer of the cake is at the depth 4, which is the depth of the first layer. Therefore, the category determining unit 202 determines the cake as the category of the first layer related to the keyword.

Note that, the method of determining the category of the first layer or the second layer related to the keyword is not limited to the method described above. For example, this method differs depending on the format of the category information. FIG. 7 is a diagram illustrating category information in a format different from the category information of FIG. 6. The category information shown in FIG. 7 is called a category information table 600. The category information table 600 has a category 602 and an upper category 604. The upper category 604 represents all the upper categories to which a category indicated in the category 602 belongs.

Suppose that, in a case where the category information is represented in the category information table 600 of FIG. 7, a keyword "Mont Blanc" is input. Also, suppose that the category of the first layer is the layer at the depth 4 and the category of second layer is the layer at the depth 5.

In this case, the category determining unit 202 searches the category information table 600 using the keyword Mont Blanc, and acquires a record in the sixth row. Then, the category determining unit 202 determines: the cake that is in the layer at the depth 4 among the categories indicated in the upper category 604 of the acquired record, as the category of the first layer; and determines the cut cake that is in the layer at the depth 5, as the category of the second layer.

In the hierarchy of categories, the depth of the first layer is determined in advance. The information indicating the depth of the first layer may be preset by the information processing apparatus 200 or may be stored in a storage device which is accessible to the information processing apparatus 200.

The second layer may be a layer at any depth located under the category of the first layer. Which depth of layer is set as the second layer may be determined in advance or may be dynamically determined by the category determining unit 202. In the latter case, for example, the category determining unit 202 sets the lowest category that may be determined from the keyword, as the category of the second layer. For example, suppose that the hierarchical structure of categories has been shown in FIG. 2 and a keyword "strawberry shortcake" is input. In this case, the determined category in the lowest is a shortcake. Therefore, the category determining unit 202 determines the shortcake as the category of the second layer related to the keyword.

In the case where a depth of the second layer is determined in advance, information indicating the depth of the second layer may be preset by the category determining unit 202, or may be stored in a certain storage device which is accessible to the category determining unit 202.

<Acquiring of Information on Products: S108>

The first display control unit 204 acquires information on products belonging to the category of the first layer, which is determined by the category determining unit 202 (S108). FIG. 8 is a diagram illustrating information on products in a table format. A table in FIG. 8 is called a product information table 500. The product information table 500 has three columns of a product ID 502, product information 504, and category 506. The product ID 502 indicates a product ID. The product information 504 indicates various information related to a product determined by the product ID 502. A category 506 indicates a category to which the product determined by the product ID 502 belongs.

The product information 504 indicates, for example, a product name, a price, a last reference date and time, or the like. The last reference date and time indicates the latest date and time, among dates and times when information on the product determined by the product ID 502 is displayed on the display device 10.

The category 506 indicates, at least, a category located in the lowest layer among the categories to which the product determined by the product ID 502 belongs. For example, in the example of FIG. 2, at least, a category called Mont Blanc is indicated in the category 506 related to a strawberry Mont Blanc.

The categories of the second or higher layer from the bottom may be indicated in the category 506 or may not be indicated. In the latter case, the category, which is not indicated in the category 506 among the categories to which the product belongs, may be determined by searching the category information using the category indicated in the category 506.

For example, in the example of FIG. 2, suppose that only the Mont Blanc is indicated in the category 506 related to the strawberry Mont Blanc. In this case, by searching the category information table 400 and the category information table 600 using the category called Mont Blanc, it is possible to determine upper categories (cut cake, cake, and the like) to which the Mont Blanc belongs.

The product information table 500 may be stored inside the information processing apparatus 200 or may be stored externally. Hereinafter, the storage device storing the product information table 500 is called a product information storage device. The product information storage device is a certain storage device.

The first display control unit 204 acquires information to be displayed on the display device 10 from the product information storage device. For example, in a case where a product name of a certain product is displayed on the display device 10, the first display control unit 204 acquires the product name corresponding to the product ID of the product from the product information storage device. Note that, the first display control unit 204 may acquire information not to be displayed on the display device 10 in addition to the information to be displayed on the display device 10.

There are various triggers for the first display control unit 204 to acquire the product information. For example, each time the category determining unit 202 determines a category of the first layer related to the keyword, the first display control unit 204 acquires the product information on the products belonging to that category. In another example, the first display control unit 204 may acquires information on the products belonging to the category, in a case where the category determining unit 202 determines the category of the first layer related to the keyword and a predetermined condition is satisfied.

The predetermined condition is, for example, a condition that "keywords for which the category of the same first layer is determined are input a predetermined number of times or more within a predetermined period". In this way, in a case where keywords related to a certain category are input frequently, information on products belonging to that category is displayed on the display device 10.

Also, for example, the predetermined condition is a condition that "the same keyword is input a predetermined number of times or more within a predetermined period". In this way, in a case Where a certain keyword is input frequently, information on products belonging to the category of the first layer related to the keyword is displayed on the display device 10.

The method of acquiring information on the products in a case where a predetermined condition is satisfied as described above, is particularly useful in a case where a keyword is input by voice. This is because, in the case of acquiring the conversation between the customer and the store clerk by a voice input, there are many cases where words not related to the product are included in the voice.

The information indicating the predetermined condition may be preset by the first display control unit 204 or may be stored in a storage device which is accessible to the first display control unit 204.

<Display of Information on Products: S112>

The first display control unit 204 causes the display device 10 to display information on the products (S112). A product, whose information is displayed on the display device 10, is a product belonging to the category of the first layer which is determined by the category determining unit 202. Note that, the method of determining a priority of display (hereinafter, display priority) with respect to information on the products will be described later.

Figure 9:
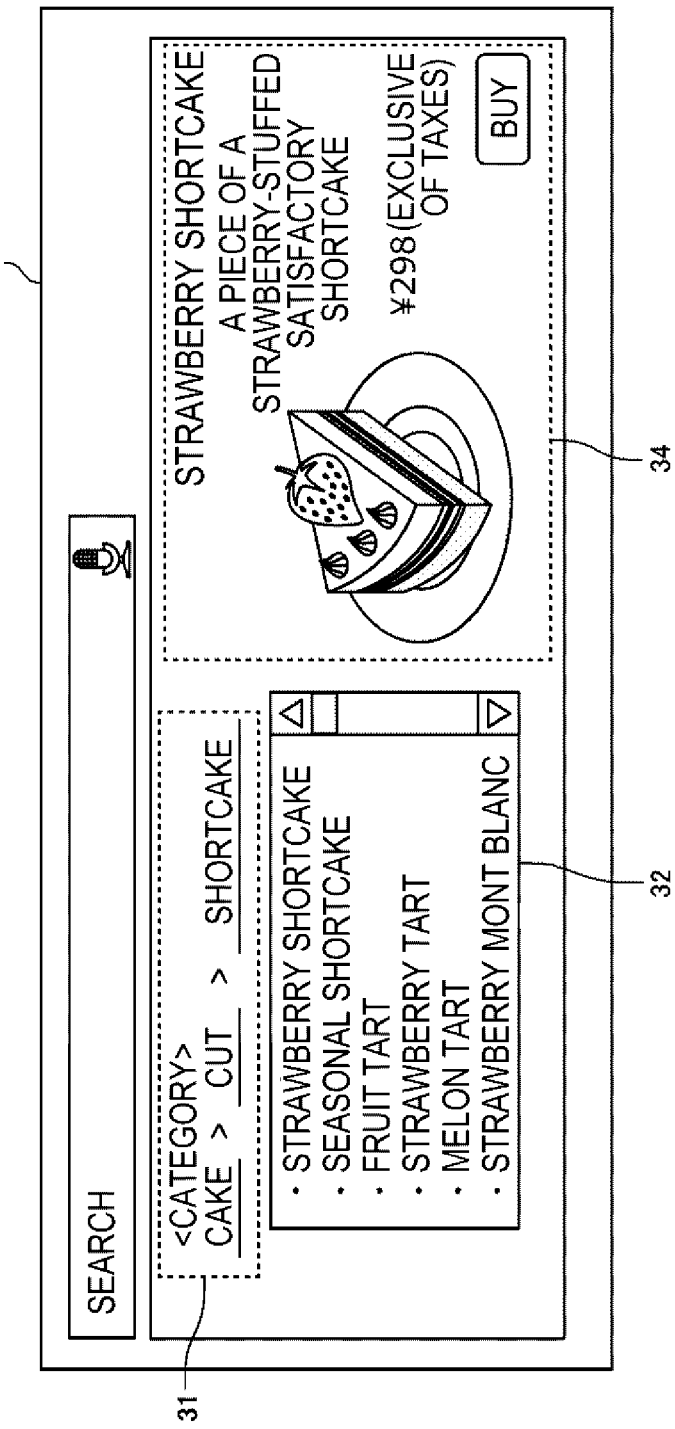
FIG. 9 is a diagram illustrating a scene in which the information on the products is displayed in a list format.

A way of display of information on the products on the display device 10 is arbitrary. For example, the first display control unit 204 causes the display device 10 to display information on respective products in a list format. FIG. 9 is a diagram illustrating a scene in which information on products is displayed in a list format. The window 30 is a window which is displayed on the display device 10.

The window 30 includes a category area 31, a product name area 32, and a detailed area 34. The category area 31 is an area where the categories determined by the category determining unit 202 are displayed. In the category area 31, the leftmost category is a category of the first layer determined by the category determining unit 202. In the category area 31, the rightmost category is a category of the lowest layer determined by the category determining unit 202. In the example of FIG. 9, the category of the first layer, which is determined by the category determining unit 202, is a cake. Then, the category determining unit 202 determines a cut (cut cake) as a category of the next layer to the first layer.

The product name area 32 is an area where the names of respective products belonging to the category of the first layer, which is determined by the category determining unit 202, are displayed. In the example of FIG. 9, the category of the first layer, which is determined by the category determining unit 202, is a cake. Therefore, in the product name area 32, the names of respective products belonging to the category referred to as the cake are displayed.

The detailed area 34 is an area Where detailed information on a certain product included in the product name area 32 is displayed. Specifically, the detailed area 34 includes a name of a selected product, a description of the product, a price of the product, and an image of the product. In FIG. 9, the detailed information on the strawberry shortcake is displayed in the detailed area 34.

For example, the product displayed in the detailed area 34 is selected from the product name area 32 by a user operation. Any operations may be adopted as this user operation. For example, the user operation is an operation of tapping or clicking on a product name displayed in the detailed area 34.

Note that, a way of display shown in FIG. 9 is merely an example, and a display on the display device 10, which is performed by the first display control unit 204, is not limited to the example in FIG. 9.

<<Processing in Case where Plurality of Categories of First Layer are Determined>>

There is a case where a plurality of categories of the first layer related to the input keyword are determined. For example, in a case where a keyword "kaki" is input, it is possible that both the category of the first layer to which the persimmon of fruit belongs and the category of the first layer to which the oyster of seafood belongs are determined.

There are various methods in which the first display control unit 204 handles a plurality of determined categories of the first layer. For example, the first display control unit 204 does not acquire information on products regarding the keyword for which the plurality of categories of the first layer are determined. In this case, information on the products is acquired and displayed only in a case where a keyword for which the only one category of the first layer is determined is input. In another example, the first display control unit 204 may randomly select one category from a plurality of determined categories of the first layer and may cause the display device 10 to display information on the products belonging to the selected category. In another example, the first display control unit 204 causes the display device 10 to display products belonging to the category of the first layer which is most frequently determined from respective input keywords, among a plurality of determined categories of the first layer.

<Regarding Display Priority>

The first display control unit 204 causes the display device 10 to display information on respective products belonging to a category of the second layer, which is determined by the category determining unit 202, at a higher priority than information on the other products. Here, various methods may be adopted as a method of displaying information on the products according to the priorities. For example, suppose that information on the products is displayed on the display device 10 in a list format. In this case, for example, the higher the display priority of a product is, the higher the position in the list at which the first display control unit 204 displays the information on the product is.

In the example of FIG. 9, in this way, information on the products belonging to the determined category of the second layer is displayed higher than information on the other products. Note that, in the example of FIG. 9, the shortcake is the category of the second layer. Therefore, in the product name area 32, a strawberry shortcake and a seasonal shortcake belonging to the category called shortcake are displayed higher than the other cakes.

In another example, suppose that information on products is displayed on the display device 10 in a drum roll format. In this case, for example, the higher the display priority of a product is, the closer position to the center of an area (drum) for displaying information on products at which the first display control unit 204 displays information on the product is.

Figure 10:
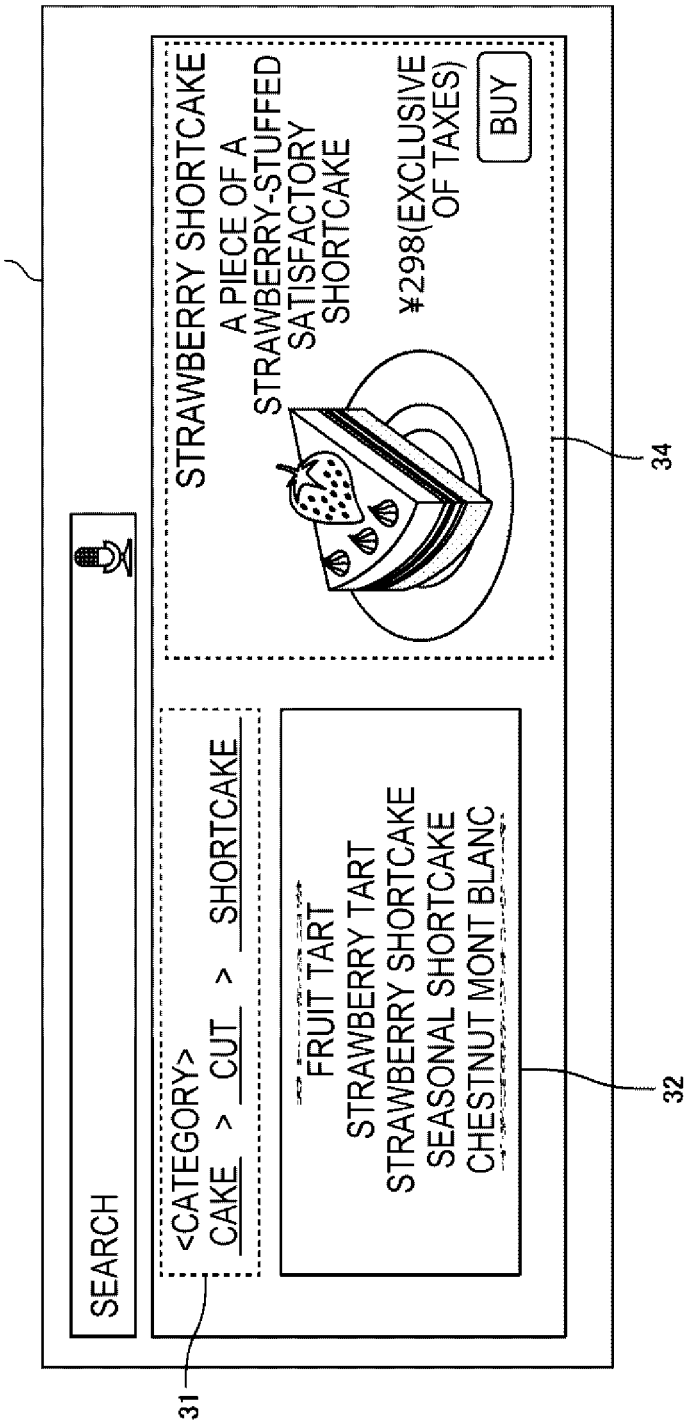
FIG. 10 is a diagram illustrating a scene in which the information on the products is displayed in a drum roll format.

FIG. 10 is a diagram illustrating the window 30 in which information on the products is displayed in a drum roll format. Also in the example of FIG. 10, the shortcake is the category of the second layer, similarly to the example of FIG. 9. Therefore, in the center of the product name area 32, the strawberry shortcake belonging to the category called shortcake is displayed. Next to that, similarly, the seasonal shortcake belonging to the category called shortcake is displayed.

Note that, in the case where there are a plurality of products (for example, the strawberry shortcake and the seasonal shortcake in FIG. 9) belonging to the determined category of the second layer, there are various methods of determining the display priority of information on the plurality of products. For example, the first display control unit 204 sets a higher display priority of information for the plurality of products in the order of earliness of read-out from the product information storage device. In another example, the first display control unit 204 may determine the display priority of information on respective products based on the product ID, the product name, the last display date and time, a display frequency, or the like. Here, the display frequency of information on a certain product is a frequency at which information on the product is displayed on the display device 10.

For example, the closer the last display date of time of a product is to the current time, the higher the display priority of the information on the product set by the first display control unit 204 becomes. Thereby, information on the product, which is browsed more recently, is displayed at a position where it is easy for the user to see. In another example, the more frequently information on a product is browsed, the higher the display priority of the information on the product set by the first display control unit 204 becomes. Thereby, information on the product, which is browsed more frequently, is displayed at a position where it is easy for the user to see.

The display frequency of information on the product may be expressed by the number of times of display within the latest predetermined period, for example. In this case, the product information 504 of the product information table 500 is configured to include a number of times of display within the latest predetermined period.

<<Display Priority of Information on Other Products>>

There are various methods of determining the display priority of information on respective products other than products belonging to the category of the second layer, which is determined by the category determining unit 202. For example, these display priorities are also determined based on the order of the read-out from the product information storage device, the product ID, the product name, the last display date and time, the display frequency, and the like.

<<Processing in Case where Plurality of Categories of Second Layer are Determined>>

There is a case where a plurality of categories of the second layer related to the input keyword are determined. There are various methods in which the first display control unit 204 handles the plurality of determined categories of the second layer.

For example, the first display control unit 204 does not determine the display priority based on the category of the second layer regarding the keyword for which a plurality of categories of the second layer are determined. In this case, for example, the first display control unit 204 determines the display priority of information on respective products belonging to the determined category of the first layer based on the order of the read-out from the product information storage device, the product ID, the product name, the last display date and time, the display frequency, and the like. The method of determining the display priority based on these has been described above.

In another example, the first display control unit 204 may randomly select one category from a plurality of determined categories of the second layer, and may set the higher display priority to information on the products belonging to the selected category than the display priority set to information on the other products. In another example, the first display control unit 204 may set the higher display priority to the products belonging to the category of the second layer that is most frequently determined from respective input keywords than the display priority of information on the other products among the plurality of determined categories of the second layer.

Second Example Embodiment

The information processing apparatus 200 according to the second example embodiment is represented in FIG. 1, similarly to the information processing apparatus 200 according to the first example embodiment. Except for the points described below, the information processing apparatus 200 of the second example embodiment has the same function as that of the information processing apparatus 200 of the first example embodiment.

After the categories of the first layer and the second layer related to a keyword are determined, the category determining unit 202 of the second example embodiment determines a category related to another keyword that is input after that keyword. Hereinafter, the former and latter keywords are called a first keyword and a second keyword, respectively. The category determining unit 202 determines each category of a first layer, a second layer, and a third layer regarding the second keyword. The third layer is a category lower than the second layer. Note that, in a case where the category determining unit 202 dynamically determines a depth of the second layer, the category determining unit 202 sets a depth of the category of the second layer related to the second keyword to be the same as the depth of the category of the second layer related to the first keyword.

The first display control unit 204 of the second example embodiment determines whether or not a condition that "the categories of the first layer and the second layer related to the second keyword are respectively the same as the categories of the first layer and the second layer related to the first keyword" is satisfied. In a case where this condition is satisfied, the first display control unit 204 changes the display of the display device 10 based on the category of the third layer, which is determined by the category determining unit 202. Specifically, the first display control unit 204 causes the display device 10 to display information on the products belonging to the determined category of the third layer at a higher priority than information on the other products.

Figure 11:
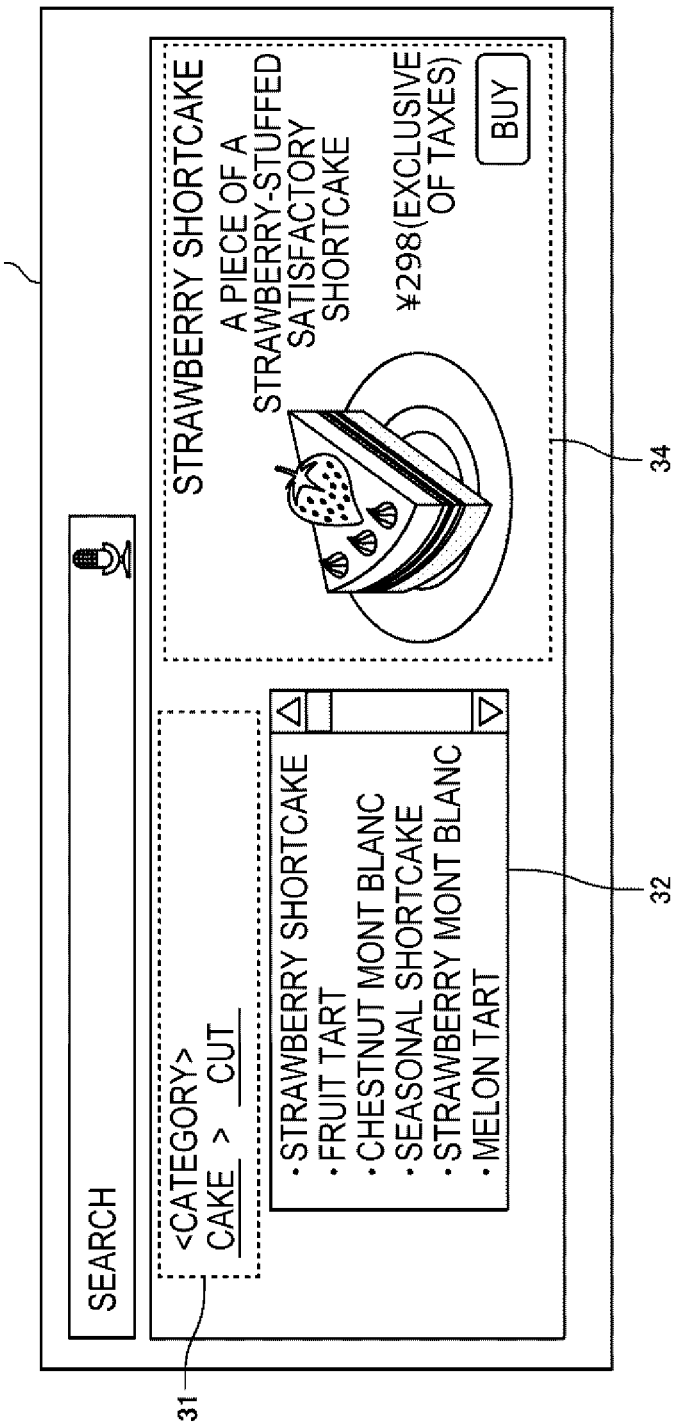
FIG. 11 is a diagram illustrating a scene after a cut cake is input as a first keyword and before a second keyword is input.
Figure 12:
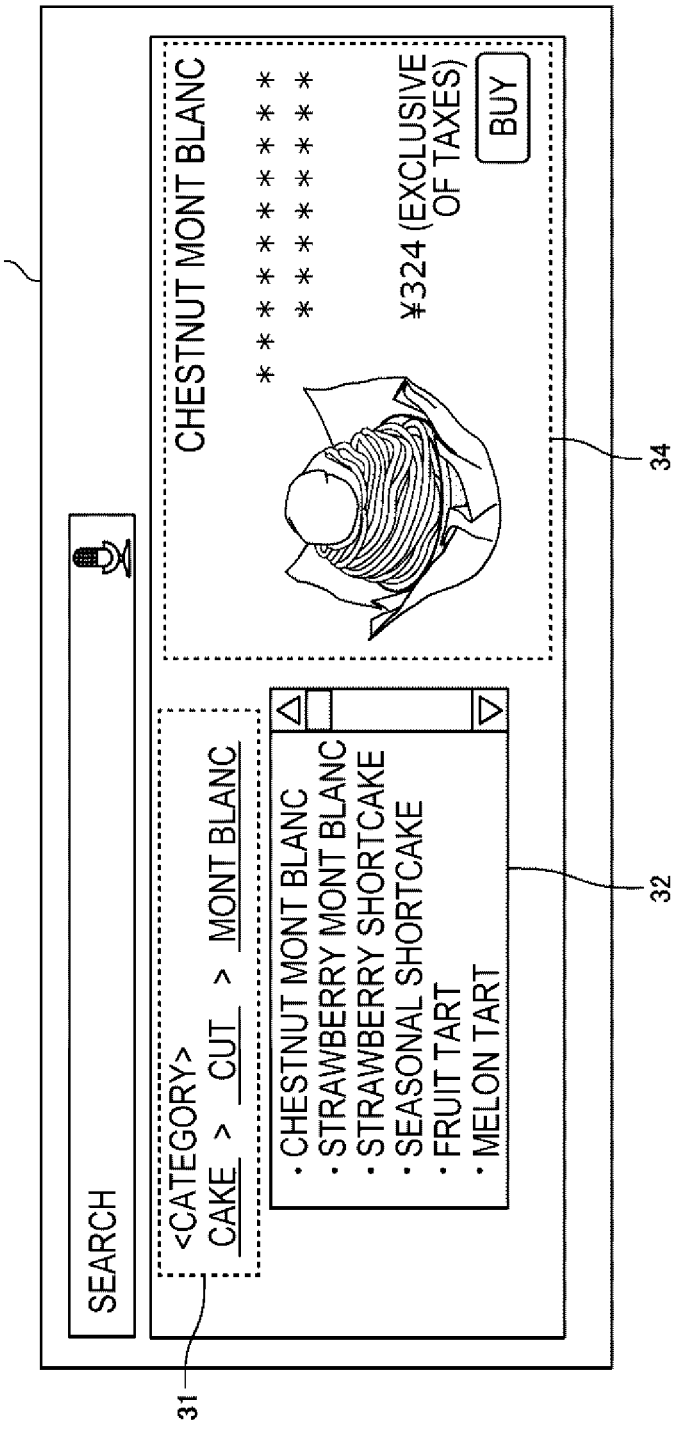
FIG. 12 is a diagram illustrating a scene after Mont Blanc is input as the second keyword.

This will be specifically described with reference to FIGS. 11 and 12. FIG. 11 illustrates a scene on display device 10 after a cut cake is input as a first keyword. On the other hand, FIG. 12 illustrates a scene after a strawberry Mont Blanc is input as a second keyword. In this specific example, the hierarchical structure of the categories has been shown in FIG. 2.

First, the first keyword is input. Then, the category determining unit 202 respectively determines the cake and the cut cake as the categories of the first layer and the second layer related to the first keyword. As a result, information on respective products belonging to the category called cake is displayed on the display device 10 (see FIG. 11). At this time, the display priority of respective products belonging to the category called cut cake is higher than the display priority of the other products. Therefore, in the product name area 32, information on the products belonging to the cut cake is displayed higher position than information on the other products.

Next, the second keyword is input. Then, the category determining unit 202 respectively determines the cake, the cut cake, and the Mont Blanc as the categories of the first layer, the second layer, and the third layer related to the second keyword. Here, the categories of the first layer and the second layer related to the second keyword are a cake and a cut cake, same as the categories of the first layer and the second layer related to the first keyword.

Then, among information on products displayed on the display device 10, the first display control unit 204 sets the higher display priority to information on respective products belonging to the Mont Blanc (the determined category of the third layer) than the display priority of the other products. As a result, in the product name area 32, information on the products belonging to the Mont Blanc is displayed higher position than information on the other products (see FIG. 12). Note that, the lightest of the category area 31 is changed to the Mont Blanc.

<Flow of Processing>

Figure 13:
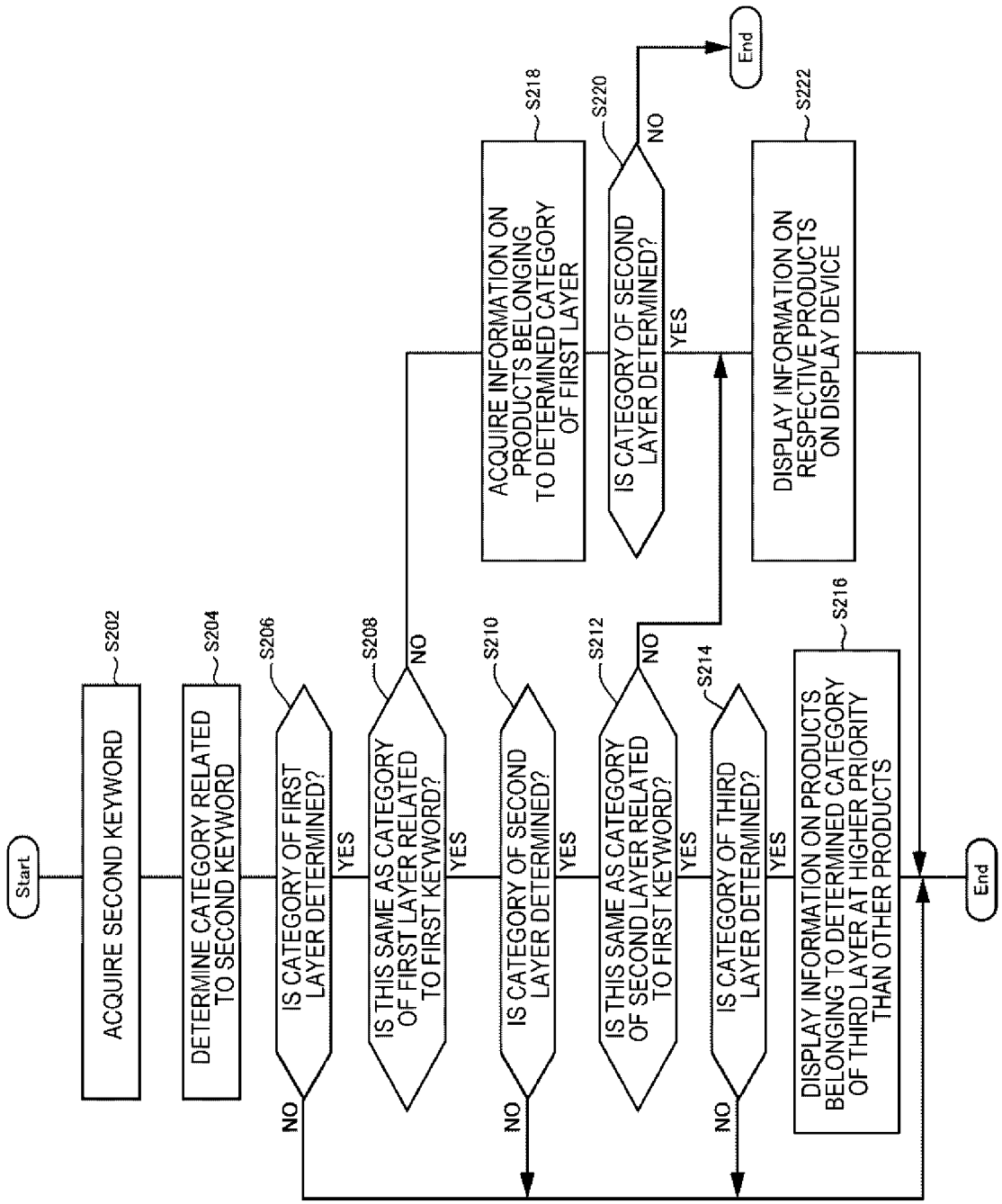
FIG. 13 is a flowchart illustrating a flow of processing executed by an information processing apparatus according to a second example embodiment.

FIG. 13 is a flowchart illustrating a flow of processing executed by the information processing apparatus 200 according to the second example embodiment. Here, the processing indicated in the flowchart of FIG. 13 is performed after the processing indicated in the flowchart of FIG. 4 is executed. Therefore, it is premised that information on the products belonging to the category of the first layer related to the first keyword is displayed on the display device 10.

The category determining unit 202 acquires the second keyword (S202). The category determining unit 202 determines a category related to the second keyword (S204). In a case where it is satisfied that "the categories of the first layer and second layer related to the second keyword are respectively the same as the categories of the first layer and the second layer related to the first keyword" (S206 to S212 are all YES) and a category of the third layer related to the second keyword is determined (S214: YES), the processing of FIG. 13 proceeds to S216. In S216, the first display control unit 204 causes information on products belonging to the determined category of the third layer to be displayed at a higher priority than information on the other products.

In cases where the category of the first layer related to the second keyword is not determined in S206 (S206: NO), the category of the second layer related to the second keyword is not determined in S210 (S210: NO), or the category of the third layer related to the second keyword is not determined in S214 (S214: NO), the processing of FIG. 13 is ended. In these cases, the information displayed on the display device 10 based on the first keyword will continue to be displayed as it is.

In a case where the category of the first layer related to the second keyword is different from the category of the first layer related to the first keyword (S208: NO), the processing of S218 to S222 is performed. The processing is the same as the processing from S108 to S112 in FIG. 4. Through the processing, the information displayed on the display device 10 is changed from information on the product belonging to the category of the first layer related to the first keyword, to information on the product belonging to the category of the first layer related to the second keyword.

<Example of Hardware Configuration>

The information processing apparatus 200 according to the second example embodiment is implemented by using the computer 100, similarly to the first example embodiment (see FIG. 3). In the example embodiment, each program module stored in the storage device 108 described above includes a program for implementing each function of the information processing apparatus 200 according to the example embodiment.

According to the information processing apparatus 200 of the example embodiment, in a situation where information on a product is displayed on the display device 10 based on the categories of a first layer and a second layer related to a first keyword, a display priority of information on the product is changed in a case where: categories of the first layer and the second layer are respectively the same as the categories of the first layer and the second layer related to a second keyword; and a category of a third layer related to the second keyword is determined. Specifically, the display priority of information on the products belonging to the category of the third layer is higher than the other display priorities. Thereby, in a case where a plurality of keywords related to each other are input, information on products belonging to a category related to an earlier input keyword is sorted based on a category related to a subsequent keyword. As a result, since the user of the information processing apparatus 200 may more easily recognize information on products which the user wishes to know, the convenience of the information processing apparatus 200 is improved.

As described above, for example, the information processing apparatus 200 extracts a keyword from the voice of the conversation between the store clerk and the customer. In such a conversation, a more specific keyword often comes out as the conversation goes on. For example, suppose that a customer firstly tell the store clerk a requirement "I want some kinds of cake". In this case, although the category of the first layer called cake may be determined, the lower category may not be determined. Then, the store clerk makes a question of "Do you want a cut cake?" In this way, the category called cut cake lower than the cake is determined. Furthermore, when the store clerk speaks that "Today's recommendation is Mont Blanc", the category called Mont Blanc lower than the cut cake is further determined.

According to the information processing apparatus 200 of the example embodiment, in a situation where a category that may be determined from keywords changes to a lower category as described above, information on the products belonging to the lower category further determined from the subsequent keyword is sorted such that it is easy for the user to see. Therefore, the convenience of the information processing apparatus 200 is improved.

Third Example Embodiment

Figure 14:
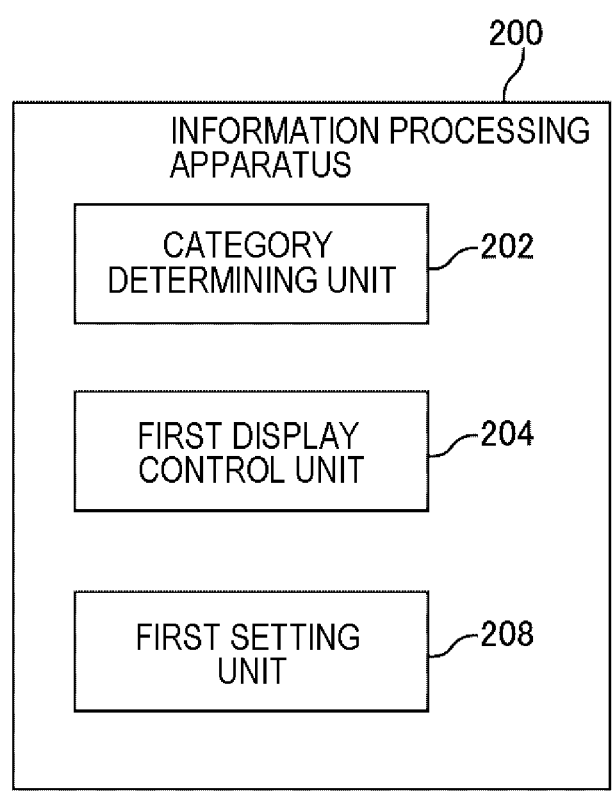
FIG. 14 is a block diagram illustrating an information processing apparatus according to a third example embodiment.

FIG. 14 is a block diagram illustrating the information processing apparatus 200 according to the third example embodiment. Except for the points described below, the information processing apparatus 200 of the third example embodiment has the same function as the information processing apparatus 200 of the first or second example embodiment.

The information processing apparatus 200 of the third example embodiment includes the first setting unit 208. In response to the input, the first setting unit 208 sets a state of the information processing apparatus 200 to either a first state or a second state. The first state is a state in which the processing of determining a category related to a keyword is performed in the category determining unit 202. On the other hand, the second state is a state in which the processing of determining the category related to the keyword is not performed in the category determining unit 202.

More specifically, in the information processing apparatus 200 of the first state, the category determining unit 202 performs processing of acquiring a keyword and processing of determining a category related to the keyword. Therefore, once a keyword is input, the display of the display device 10 is changed based on the category determined using the keyword.

On the other hand, in the information processing apparatus 200 of the second state, the category determining unit 202 does not perform the processing of acquiring a keyword, or acquires a keyword but does not perform the processing of determining a category related to the keyword. Therefore, even though a keyword is input, the display of the display device 10 is not changed.

Figure 15:
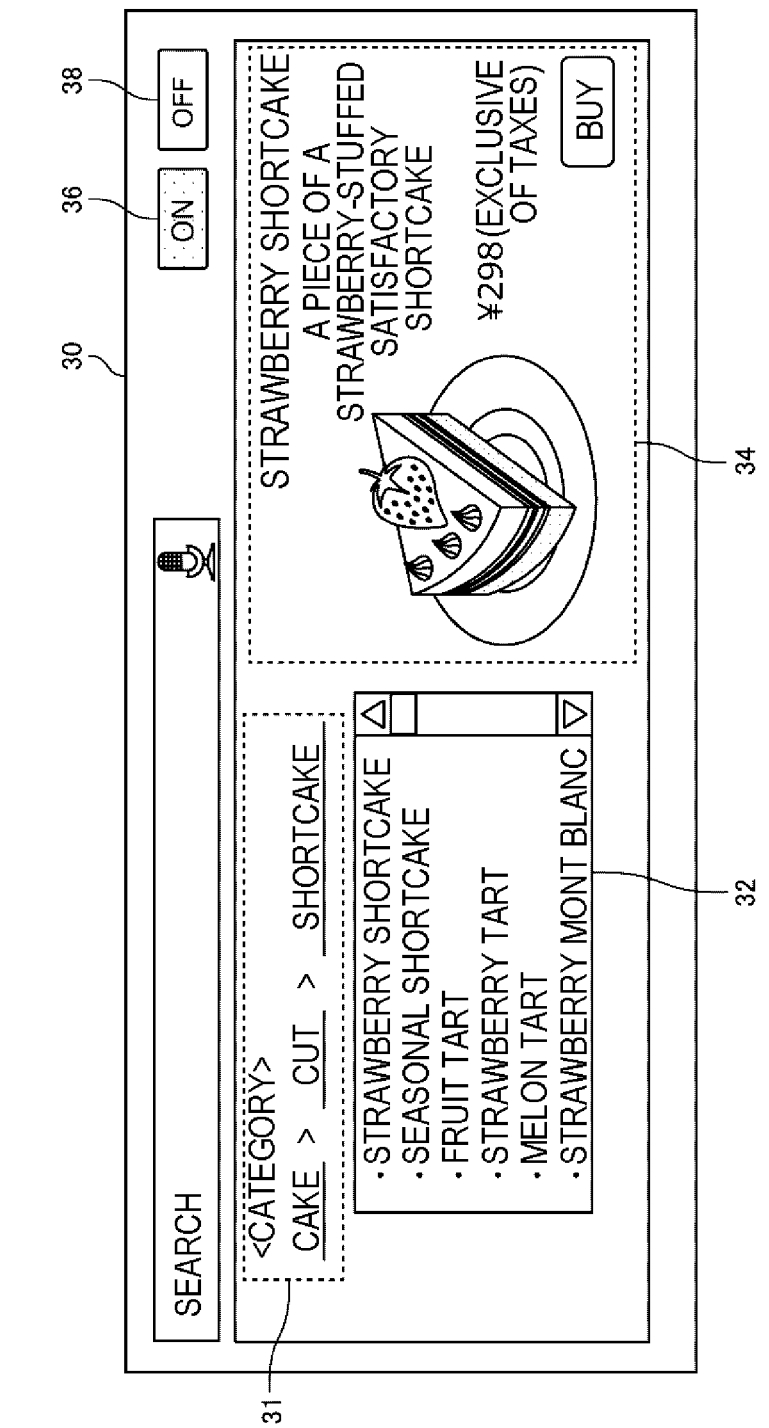
FIG. 15 is a diagram illustrating a scene where a state of the information processing apparatus is changed by a first setting unit.

FIG. 15 is a diagram illustrating a scene in which the state of the information processing apparatus 200 is changed by the first setting unit 208. The window 30 in FIG. 15 includes a button 36 and a button 38. The button 36 is a button for accepting an input for changing the state of the information processing apparatus 200 to the first state. The button 38 is a button for accepting an input for changing the state of the information processing apparatus 200 to the second state.

The first setting unit 208 accepts a predetermined input operation on the button 36 or the button 38. This operation is, for example, an operation of tapping or clicking on the button 36 or the button 38. In a case where a predetermined input operation is applied to the button 36, the first setting unit 208 sets the state of the information processing apparatus 200 to the first state. On the other hand, in a case where a predetermined input operation is performed on the button 38, the first setting unit 208 sets the state of the information processing apparatus 200 to the second state.

The state of the information processing apparatus 200 is represented by the colors of the button 36 and the button 38, for example. For example, in a case where the state of the information processing apparatus 200 is the first state, the color of the button 36 is set to red and the color of the button 38 is set to white. On the other hand, in a case where the state of the information processing apparatus 200 is the second state, the color of the button 36 is set to white and the color of the button 38 is set to red. Note that, in FIG. 15, for convenience of illustration, the red color is represented by a dot pattern. In FIG. 15, since the button 36 is a dot pattern, the state of the information processing apparatus 200 is the first state.

The method of accepting an input by the first setting unit 208 is not limited to the method of accepting the input using the button 36 or the button 38 shown in FIG. 15. For example, the first setting unit 208 may accept an input of a predetermined voice. In this case, once a predetermined voice (for example, a voice "on") for changing the state of the information processing apparatus 200 to the first state, or another predetermined voice (for example, a voice "off") for changing the state of the information processing apparatus 200 to the second state is input, the first setting unit 208 set the state of the information processing apparatus 200 to a state in response to the voice.

In another example, the first setting unit 208 may accept an input for changing a state of a hardware switch. For example, this hardware switch is a switch capable of being set to either one of two states: ON or OFF. In this case, the state of the information processing apparatus 200 is changed to a state according to the setting of the hardware switch. For example, this hardware switch is provided on the tablet terminal 40 shown in FIGS. 5A and 5B.

As described above, the category determining unit 202 of the second state may perform or may not perform acquiring of a keyword. In the latter case, the input device used for inputting a keyword may be in a state of accepting an input, or may be in a state of not accepting an input.

Example of Hardware Configuration

The information processing apparatus 200 according to the third example embodiment is implemented by using the computer 100, similarly to the information processing apparatus 200 according to the first and second example embodiments (see FIG. 3). In the example embodiment, each program module stored in the storage device 108 described above includes a program for implementing each function of the information processing apparatus 200 according to the example embodiment.

As described above, according to the example embodiment, the state of the information processing apparatus 200 may be set to either a state (the first state) in which the processing of determining a category related to the keyword is performed, or a state (the second state) in which the processing of determining a category related to the keyword is not performed. Thereby, the products displayed on the display device 10 may be set to products related only to a keyword that is input at the timing intended by the user of the information processing apparatus 200.

For example, as described above, the information processing apparatus 200 may be operated to perform an operation using the voice of the conversation between the store clerk and the customer as an input. In this case, sometimes, the conversation between the store clerk and the customer may include a conversation (for example, gossip) unrelated to information on the product which is desired to be displayed on the information processing apparatus 200.

Therefore, for example, while the store clerk talks with the customer, the store clerk operates the information processing apparatus 200 and the like for setting the information processing apparatus 200 to the first state only during a conversation related to information on the product which is desired to be displayed on the display device 10. Thereby, the store clerk may perform an appropriate customer service such that information which the customer wishes to browse is displayed on the display device 10. Note that, in the information processing apparatus 200 of this example embodiment, it is possible to switch the state of the information processing apparatus 200 by an easy operation. Therefore, in this way, the store clerk may easily perform an appropriate customer service.

Fourth Example Embodiment

Figure 16:
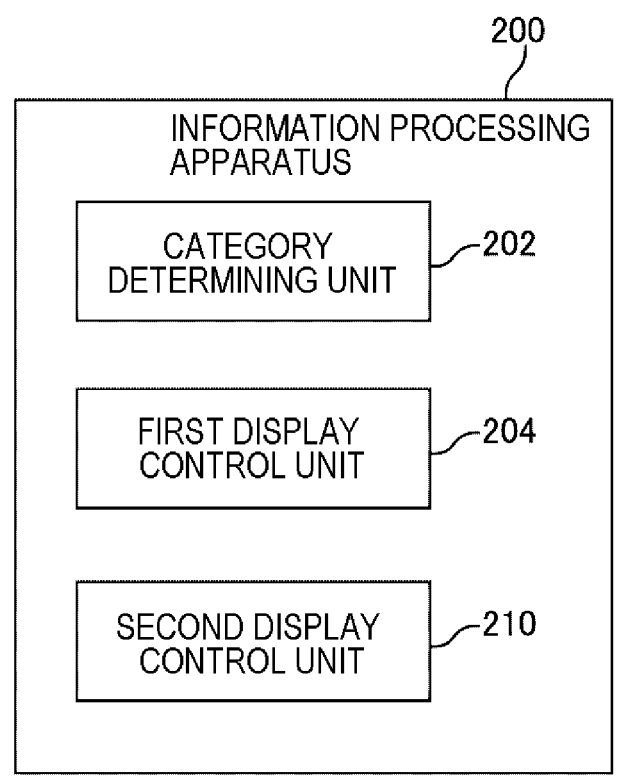
FIG. 16 is a block diagram illustrating an information processing apparatus according to a fourth example embodiment.

FIG. 16 is a block diagram illustrating the information processing apparatus 200 according to the fourth example embodiment. Except for the points described below, the information processing apparatus 200 of the fourth example embodiment has the same function as the information processing apparatus 200 of the first to third example embodiments.

The information processing apparatus 200 according to the fourth example embodiment includes a second display control unit 210. The second display control unit 210 causes the display device 10 to display specification information of the category of the first layer related to the input keyword.

Specification information of a category is arbitrary information that is able to distinguish that category from the other categories. For example, specification information of a category is a name of the category. In another example, specification information of a category is an image (an icon or the like) representing the category. Note that, specification information of a category is included in the category information table 400 in advance, for example.

Here, in a case where the icons of the other categories of the first layer have been already displayed on the display device 10, the second display control unit 210 causes the display device 10 to display specification information of the category of the first layer related to the input keyword at a higher priority than specification information of the other categories of the first layer which have been already displayed on the display device 10.

Figure 17:
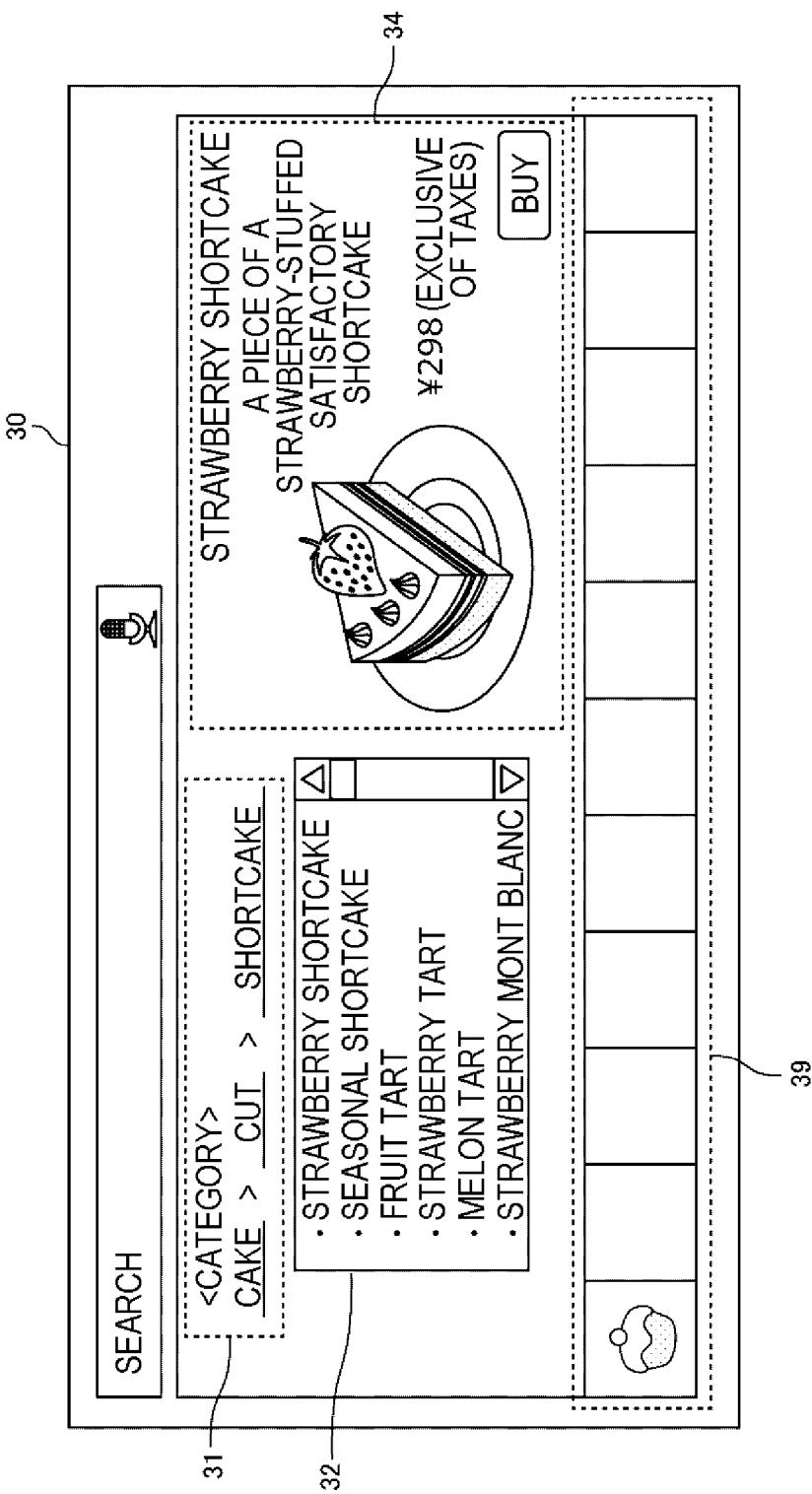
FIG. 17 is a diagram illustrating information displayed on a display device in the fourth example embodiment.

FIG. 17 is a diagram illustrating information displayed on the display device 10 in the fourth example embodiment. The window 30 in FIG. 17 includes a second category area 39 in addition to each of pieces of information included in the window 30 in FIG. 9. In the second category area 39, an icon representing the category of the first layer related to the input keyword is displayed. In FIG. 17, the category of the first layer, which is determined by the category determining unit 202, is cake. Therefore, in the second category area 39, the cake icon is displayed.

The second display control unit 210 causes the icon of the category of the first layer related to the input keyword to be displayed in the second category area 39. At this time, in the second category area 39, the second display control unit 210 sets the higher display position of the icon of the category of the first layer related to the most recently input keyword (hereinafter, the latest keyword) than the display position of the icons of the other categories of the first layer. That is, the icon of the category of the first layer related to the latest keyword is displayed at the head position of the second category area 39.

The operation of the information processing apparatus 200 according to the fourth example embodiment will be described with reference to a specific example. First, suppose that the category of the first layer related to firstly input keyword is cake. In this case, the contents of the window 30 displayed on the display device 10 becomes, for example, a scene in FIG. 17. Therefore, in the second category area 39, an icon representing the cake is displayed. In the product name area 32, information on respective products belonging to the category called cake is displayed.

Figure 18:
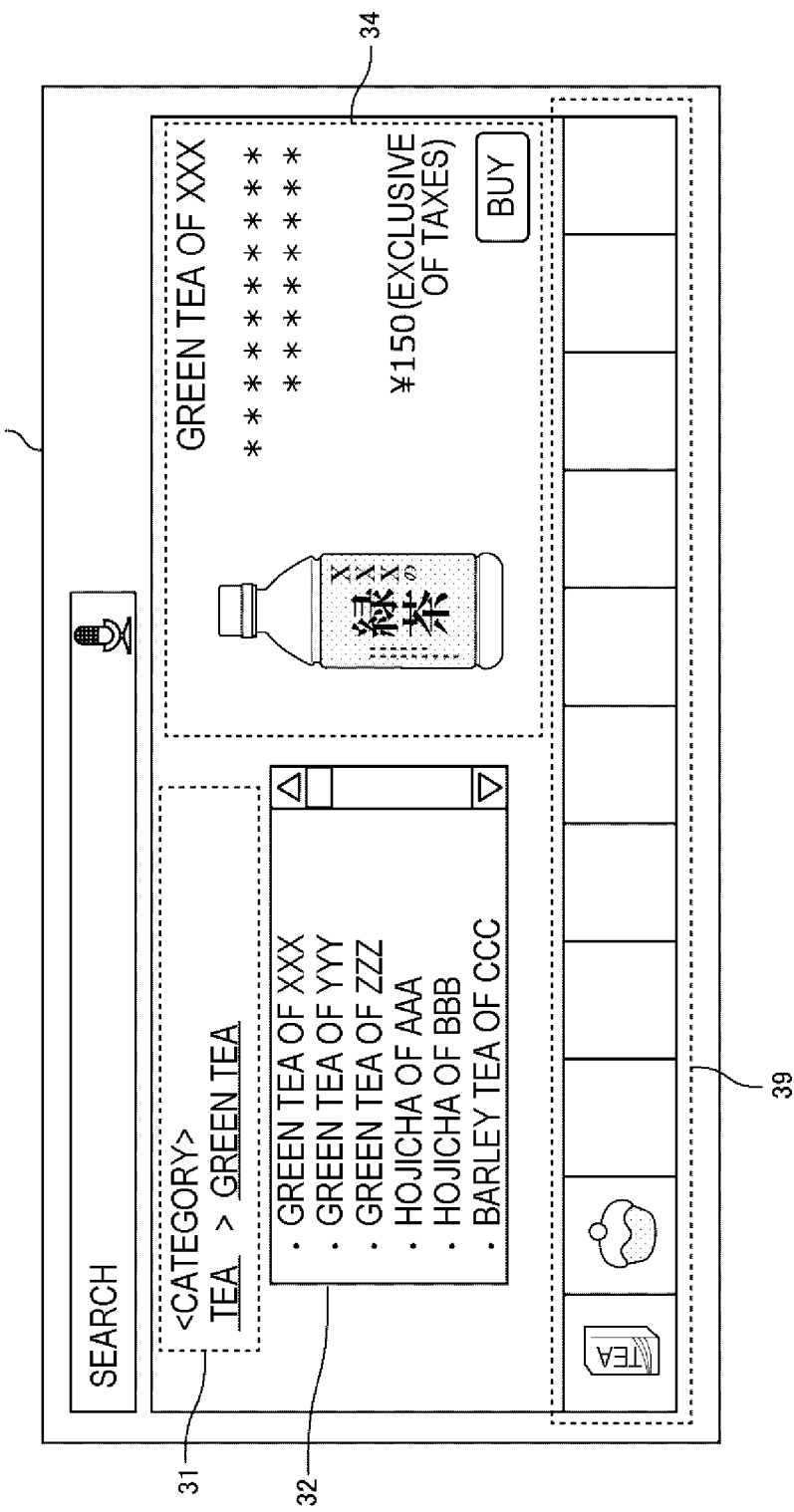
FIG. 18 is a diagram illustrating a display of the display device corresponding to a secondly input keyword.

Suppose that the category of the first layer related to the next input keyword is tea. FIG. 18 is a diagram illustrating the display of the display device 10 corresponding to the secondly input keyword. In the second category area 39, an icon representing tea is added. In the product name area 32, information on respective products belonging to the category called tea is displayed.

Here, the display priority of the icon of the category called tea that is related to the latest keyword (secondly input keyword) is higher than the display priority of the other icons. Therefore, in the second category area 39 of FIG. 18, a tea icon is displayed at the head.

Figure 19:
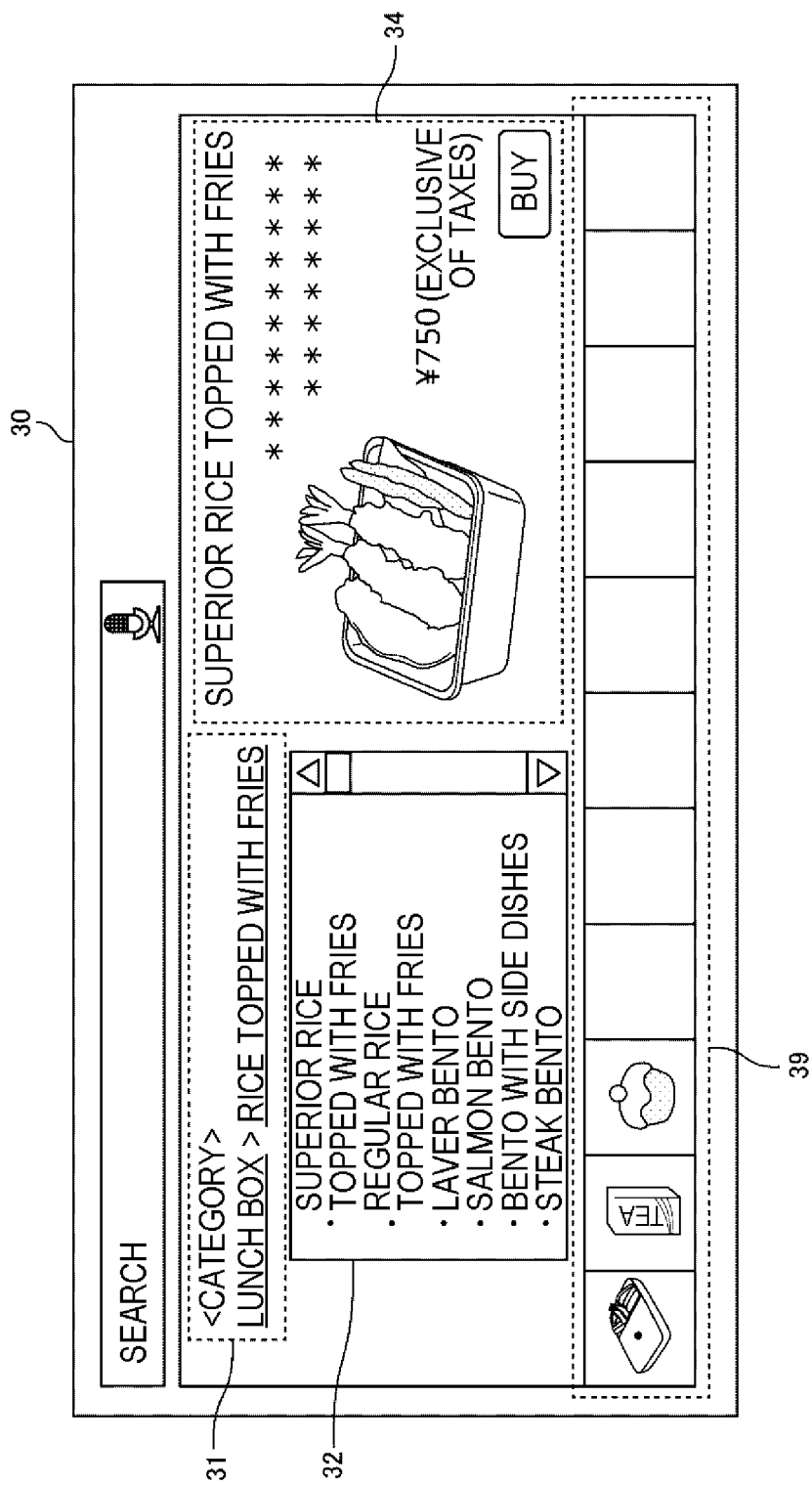
FIG. 19 is a diagram illustrating a display of the display device corresponding to a thirdly input keyword.

Suppose that the category of the first layer related to the next input keyword is lunch box. FIG. 19 is a diagram illustrating the display of the display device 10 corresponding to the thirdly input keyword. In the second category area 39, an icon representing the lunch box is added. In the product name area 32, information on respective products belonging to the category called lunch box is displayed.

Even here, the display priority of the icon of the category called lunch box that is related to the latest keyword (the thirdly input keyword) is higher than the display priority of the other icons. Therefore, in the second category area 39 of FIG. 19, a lunch box icon is displayed at the head. Regarding the display rank of the other icons, the order of arrangement until now (the order of arrangement in FIG. 18) is maintained.

Figure 20:
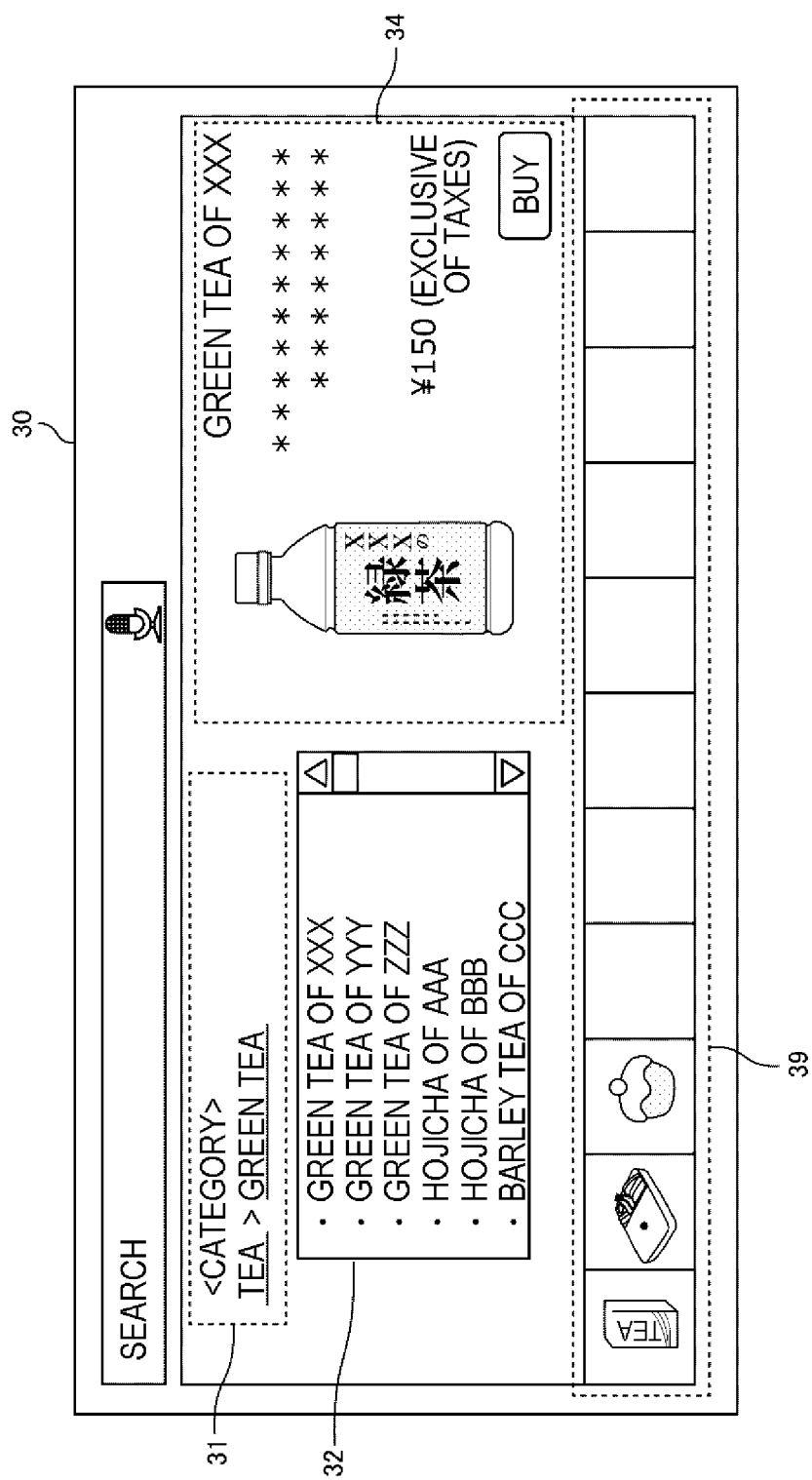
FIG. 20 is a diagram illustrating a display of the display device corresponding to a fourthly input keyword.

Suppose that the category of the first layer related to the next input keyword is tea. FIG. 20 is a diagram illustrating the display of the display device 10 corresponding to the fourthly input keyword. The second display control unit 210 sets the higher display priority to the tea than the display priority of the other icons. Here, the icon of the category of tea has been already displayed in the second category area 39. Therefore, the second display control unit 210 changes the display position of the icon of the category of tea to the head. Regarding the order of arrangement of the other icons, the order of arrangement in FIG. 19 is maintained. Note that, in the product name area 32, information on respective products belonging to the category called tea is displayed.

Here, as described in the first example embodiment and the second example embodiment, the first display control unit 204 determines the display priority of information on the products to be displayed in the product name area 32, based on the category of the second layer or the category of the third layer determined using the input keyword. For example, the example of FIG. 18 assumes a case where green tea is input as a keyword. Therefore, in the product name area 32, information on respective products referred to as a "green tea of . . . " is displayed at a higher position than information on the other products.

Note that, suppose that the category of the first layer determined using the latest keyword is the same as the category of the first layer determined using the keyword input before that. On the other hand, suppose that the category of the second layer determined using the latest keyword is different from the category of the second layer determined using the keyword input before that. In this case, since the icon of the category of the first layer determined using the latest keyword has been already displayed at the head of the second category area 39, the display of the second category area 39 is not changed. On the other hand, the display of the product name area 32 is changed based on the category of the second layer determined using the latest keyword. Hereinafter, specific examples will be described.

Suppose that the category of the first layer related to the keyword referred to as green tea is tea and the category of the second layer is green tea. Also, suppose that the category of the first layer related to the keyword referred to as Hojicha is tea, and the category of the second layer is Hojicha. Suppose that, under these assumption, the window 30 transits to the state described by FIG. 18 as a result of that a keyword referred to as green tea is input. Next, suppose that a keyword referred to as Hojicha is input.

Figure 21:
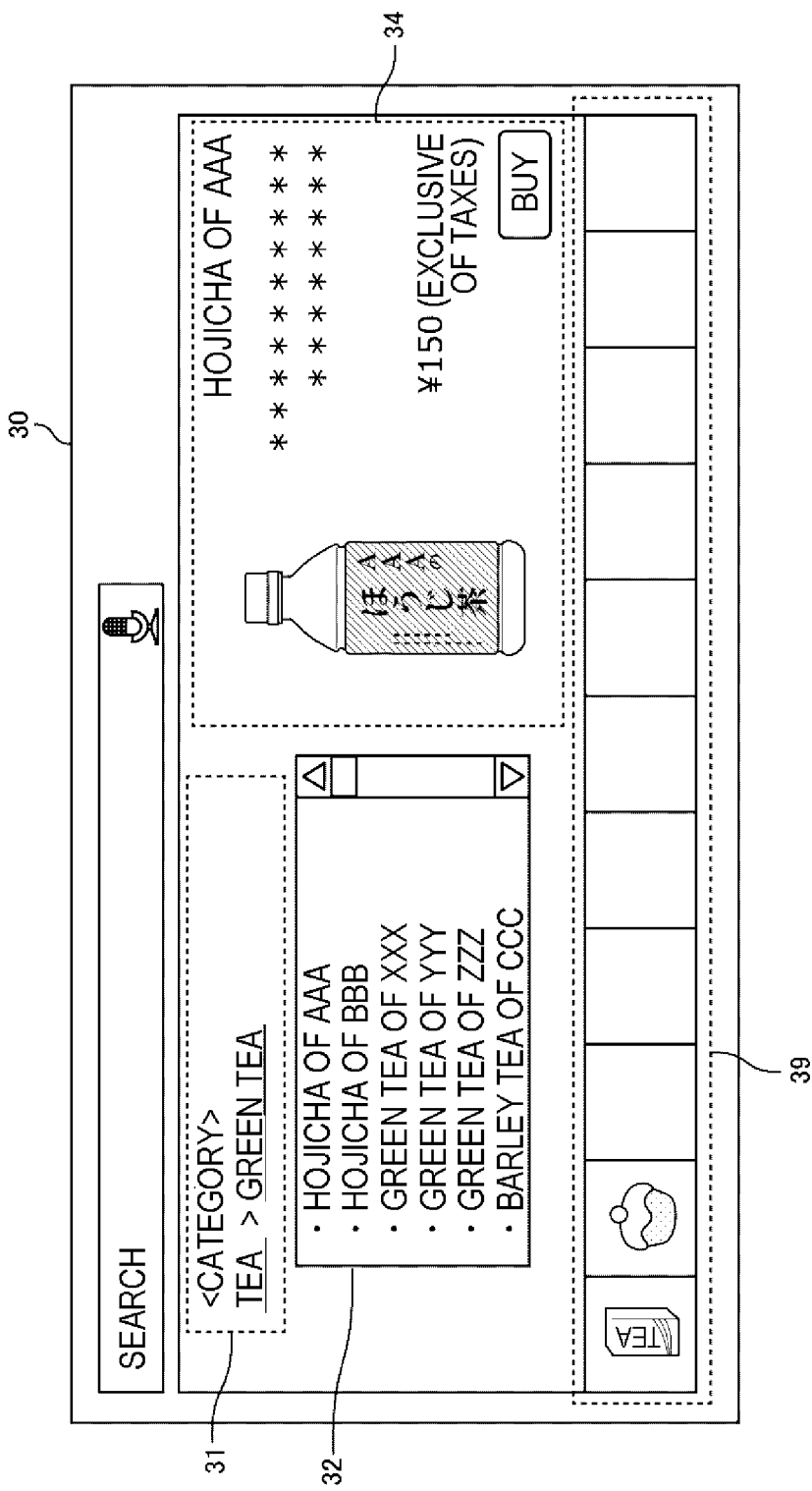
FIG. 21 is a diagram illustrating a window after a keyword referred to as Hojicha is input.

FIG. 21 is a diagram illustrating the window 30 after the keyword referred to as Hojicha is input. The category of the first layer related to the keyword referred to as Hojicha is tea. Since the tea icon has been already displayed at the head of the second category area 39, the display of the second category area 39 is not changed.

On the other hand, the category of the second layer related to the keyword referred to as Hojicha is Hojicha, not green tea. Therefore, the first display control unit 204 changes the display of the product name area 32 based on the determined category of the second layer referred to as Hojicha. Specifically, in the product name area 32, information on the product referred to as the "Hojicha of . . . " is displayed at higher position than information on the other products. As described above, in a case where the window 30 in FIG. 21 is compared with the window 30 in FIG. 18, the display of the second category area 39 is not changed, but the display of the product name area 32 is changed.

Note that, the display position of the category of the first layer with a higher display priority is not limited to the head of the second category area 39. For example, in a case where, in the second category area 39, the category is displayed in the drum roll format, the second display control unit 210 may set the category of the first layer with a higher display priority to be displayed closer to the center of the drum.

As described above, (1) in a case where an icon of the category of the first layer related to the latest keyword is not displayed in the second category area 39, the information processing apparatus 200 adds the icon to the head of the second category area 39. Also, (2) in a case where the icon of the category of the first layer related to the latest keyword has been already displayed at other than the head of the second category area 39, the information processing apparatus 200 changes the display position of the icon to the head of the second category area 39. Furthermore, (3) in a case where the icon of the category of the first layer related to the latest keyword has been already displayed at the head of the second category area 39, the information processing apparatus 200 changes the display of the product name area 32 based on the category of the second layer related to the latest keyword, without changing the display of the second category area 39.

By such an operation of the information processing apparatus 200, the user of the information processing apparatus 200 may easily recognize the category (the category of the first layer) related to the latest keyword. Also, as in the above example, since the icon of the category of the first layer related to the past input keyword are displayed in the second category area 39, the user of the information processing apparatus 200 may also easily recognize the categories related to the past input keywords.

<Case in which Plurality of Categories of First Layer are Determined>

As described in the first example embodiment, there is a case where a plurality of categories of the first layer related to the input keyword are determined. In such a case, there are various methods in which the second display control unit 210 handles the plurality of determined categories of the first layer.

For example, the second display control unit 210 causes the display device 10 to display specification information, only in a case where a keyword for which only one category of the first layer is determined is input. In another example, the second display control unit 210 may randomly select one category from the plurality of determined categories of the first layer and may cause the display device 10 to display the specification information of the selected category. In another example, the second display control unit 210 may cause the display device 10 to display the specification information of the category of the first layer that is most frequently determined from the input keywords, among the plurality of determined categories of the first layer.

<Processing in Response to Selection of Specification Information>

In the display device 10, specification information of a category may be displayed in a selectable state. In this case, in response to the selection of one piece of the specification information of a category displayed on the display device 10, the second display control unit 210 may cause the display device 10 to display information on respective products belonging to the selected category.

For example, suppose that the cake icon is selected in the state of FIG. 20. In this case, the second display control unit 210 displays information (information displayed in the product name area 32 in FIG. 17) on the products belonging to the category called cake in the product name area 32. At this time, the selected icon may be displayed to be distinguishable from other icons. For example, the second display control unit 210 changes a color of the selected icon.

Note that, each category of the first layer corresponding to each of pieces of the specification information displayed in the second category area 39 is determined as the category related to the input keywords until now. Therefore, information on respective products belonging to the categories is currently displayed or has been previously displayed in the product name area 32. That is, information on the products has been already acquired by the first display control unit 204. For example, in a case where the display of the display device 10 is set to a state shown in FIG. 20, all information on respective products belonging to the categories called cake, tea, or lunch box has been already acquired by the first display control unit 204.

Therefore, it is preferable that the information processing apparatus 200 is configured to store in a cache the information on products belonging to respective categories of the first layer determined using the specification information displayed in the second category area 39. Thereby, it is unnecessary to acquire the information on the products from the product information storage device again, and the time required for displaying information on the products is shortened. Also, the processing load of the information processing apparatus 200 may be reduced. Note that, this cache may be implemented inside the information processing apparatus 200 or may be externally implemented. In the latter case, for example, the cache is implemented by using a cache server.

<Hardware Configuration Example>

The information processing apparatus 200 according to the fourth example embodiment is implemented by using the computer 100, similarly to the information processing apparatuses 200 of the first to third example embodiments (see FIG. 3). In the example embodiment, each program module stored in the storage device 108 described above includes a program for implementing each function of the information processing apparatus 200 according to the example embodiment.

According to the information processing apparatus 200 of the example embodiment, specification information on the category of the first layer related to the input keyword is displayed on the display device 10. The specification information is displayed on the display device 10 at a higher priority than other specification information. Therefore, the user of the information processing apparatus 200 may easily recognize the category of the first layer related to the input keyword.

The specification information on the category of the first layer may be displayed on the display device 10 in a selectable state. In this case, the information processing apparatus 200 causes the display device 10 to display the information on the products belonging to the category of the first layer determined using the selected specification information. Therefore, the user of the information processing apparatus 200 may easily browse the information on the products belonging to the respective categories of the first layer related to respective input keywords until now.

In the case where the information processing apparatus 200 is used for the customer service, the store clerk may respond to a plurality of customers. More specifically, for example, the store clerk may respond to a customer B after responding to a customer A. Then, the store clerk may respond to the customer A again. In such a case, it is conceivable that the information displayed on the display device 10 when firstly responding to the customer A is often desired to be also displayed when responding to the customer A again.

According to the information processing apparatus 200 of the example embodiment, in such a case, the specification information of the category of the first layer related to the keyword that is input when firstly responding to the customer A is also displayed on the display device 10 when responding to the customer A next. Therefore, in a case of responding to the customer A next, by selecting this specification information, it is possible to cause the display device 10 to immediately display information on the products which the customer A wishes to see. Therefore, the customer service may be performed efficiently.

Fifth Example Embodiment

Figure 22:
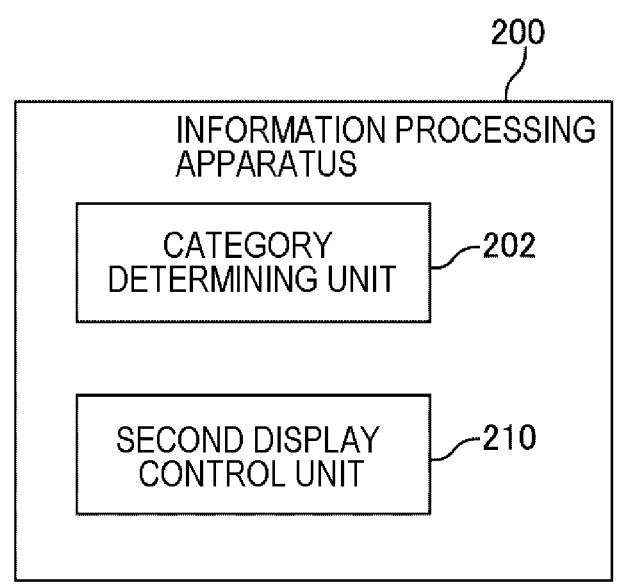
FIG. 22 is a block diagram illustrating an information processing apparatus according to a fifth example embodiment.

FIG. 22 is a block diagram illustrating the information processing apparatus 200 according to the fifth example embodiment. Except for the points described below, the information processing apparatus 200 of the fifth example embodiment has the same function as the information processing apparatus 200 of the fourth example embodiment.

The information processing apparatus 200 of fifth example embodiment includes the second display control unit 210. Therefore, the specification information of the category of the first layer according to the input keyword is displayed on the display device 10. Also, in response to the selection of the specification information on the category of the first layer, information on respective products belonging to the selected category is displayed on the display device 10. Note that, the second display control unit 210 determines the display order of information on the products to be displayed on the display device 10.

On the other hand, the information processing apparatus 200 of the fifth example embodiment does not have the first display control unit 204. Therefore, unlike the information processing apparatus 200 of the first example embodiment, the display of information on the products in response to acquiring of the keyword is not performed.

Figure 23:
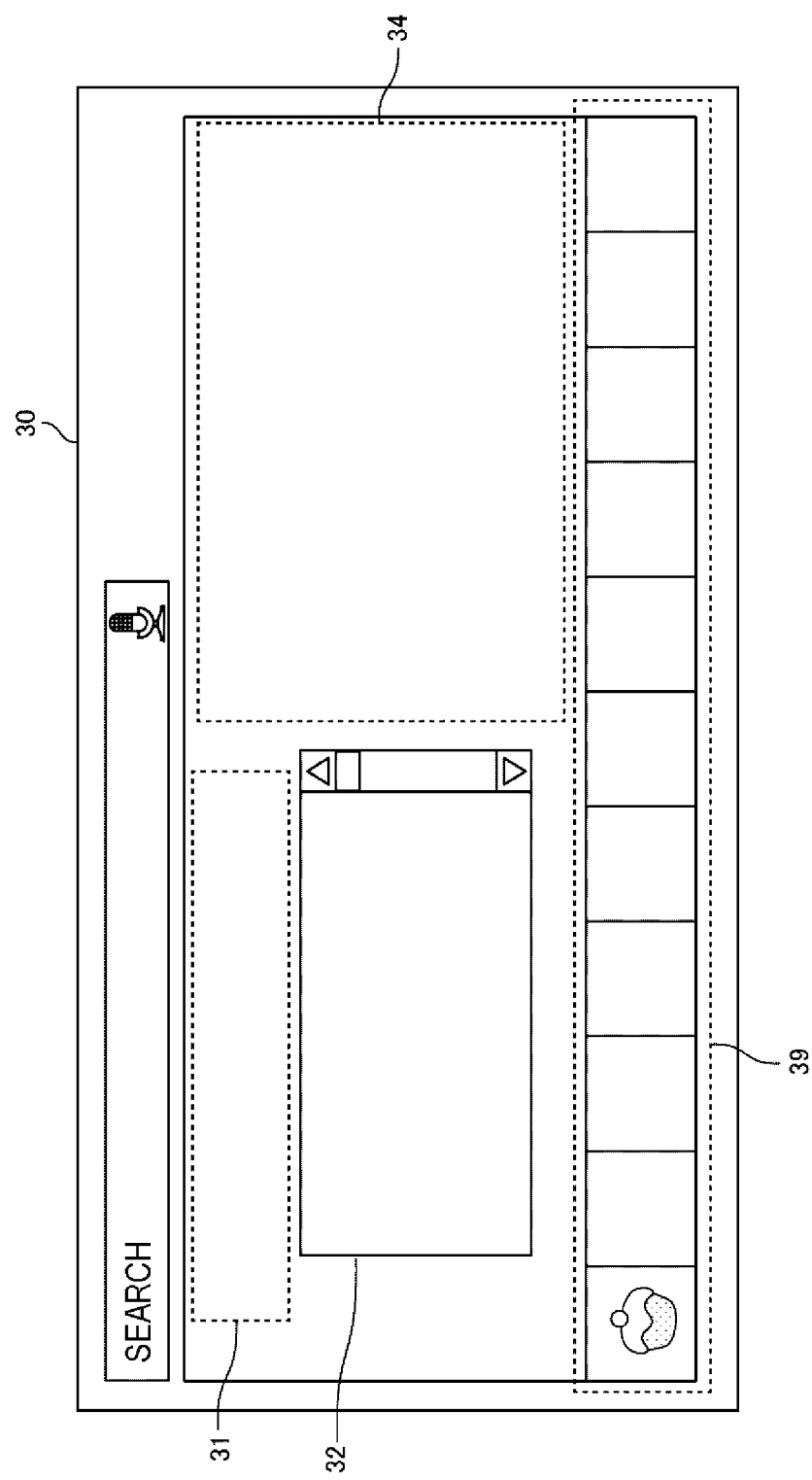
FIG. 23 is a diagram illustrating a display of the display device corresponding to the firstly input keyword.
Figure 24:
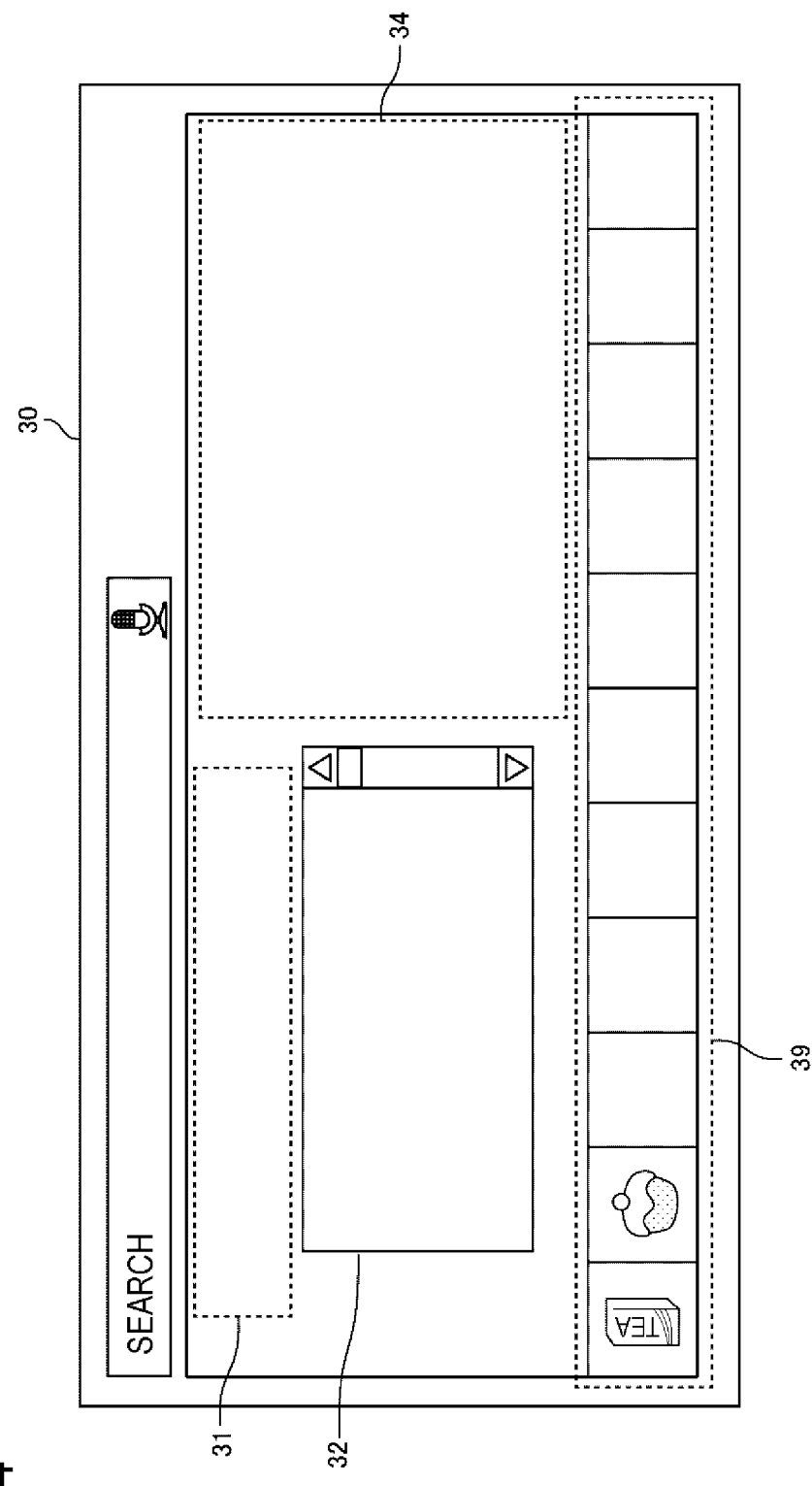
FIG. 24 is a diagram illustrating a display of the display device corresponding to the secondly input keyword.

A specific example of the operation of the information processing apparatus 200 according to the fifth example embodiment will be described with reference to the drawings. FIG. 23 and FIG. 24 are diagrams illustrating the display of the display device 10 in a case where a plurality of keywords are sequentially input to the information processing apparatus 200 according to the fifth example embodiment. FIG. 23 is a diagram illustrating the display of the display device 10 corresponding to the firstly input keyword. In the example of FIG. 23, the category of the first layer related to the input keyword is cake. Therefore, the second display control unit 210 causes the display device 10 to display an icon representing the cake. As a result, an icon representing the cake is displayed in the second category area 39. On the other hand, information on the product is not displayed in the product name area 32.

FIG. 24 is a diagram illustrating the display of the display device 10 corresponding to the secondly input keyword. In the example of FIG. 24, the category of the first layer related to the input keyword is tea. Therefore, in the second category area 39, an icon representing tea is displayed. On the other hand, information on the product is not displayed in the product name area 32.

Figure 25:
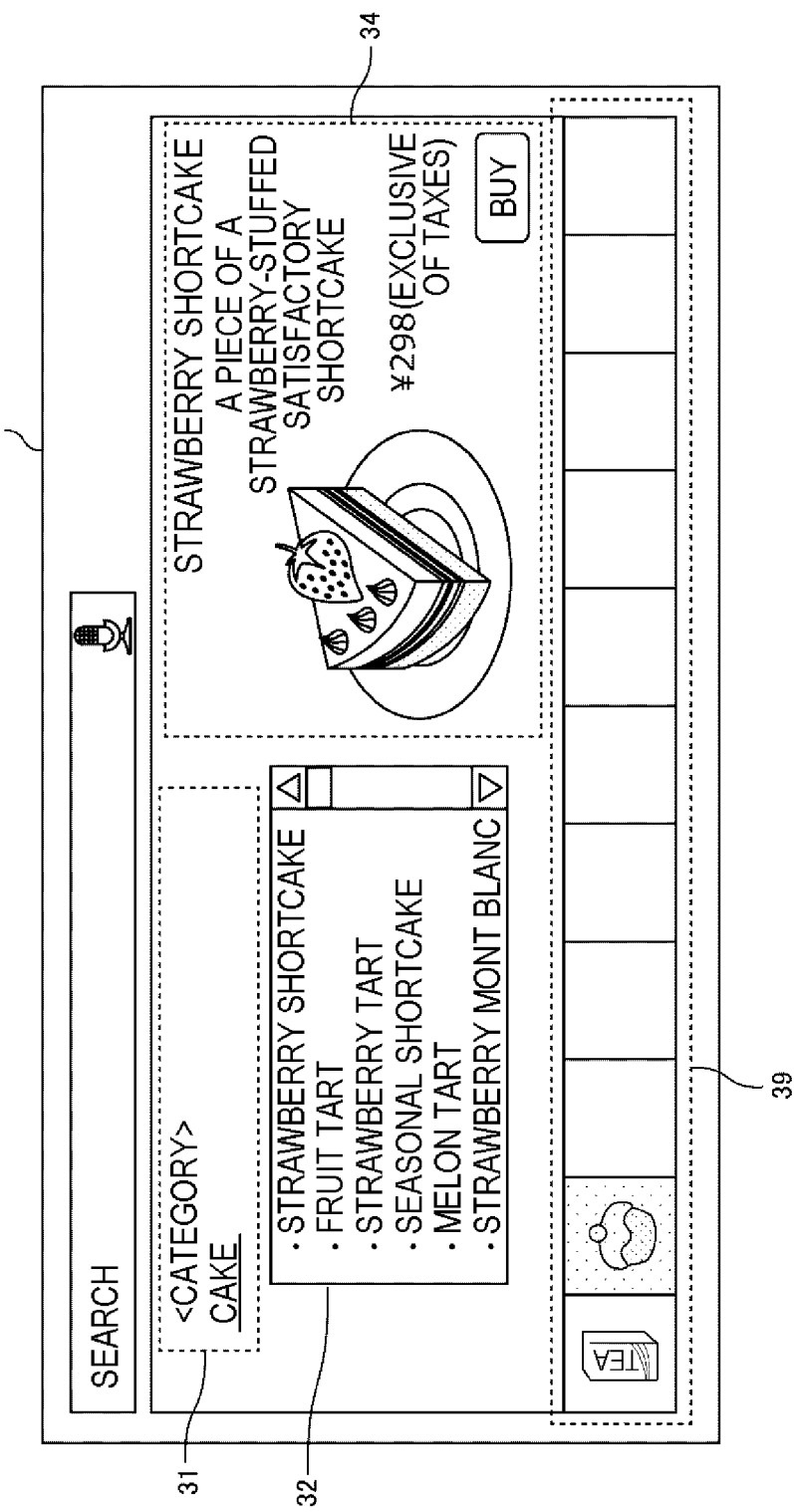
FIG. 25 is a diagram illustrating a display of the display device in a case where a cake icon is selected in the state of FIG. 24.

In a state shown in FIG. 24, suppose that the user of the information processing apparatus 200 performs an input for selecting a cake icon. FIG. 25 is a diagram illustrating a display of the display device in a case where the cake icon is selected in the state of FIG. 24. In response to the selection of the cake icon, the first display control unit 204 acquires information on respective products belonging to the category called cake from the product information storage device and causes the display device 10 to display the information. As a result, information on respective products belonging to the category called cake is displayed in the product name area 32. Note that, in FIG. 25, the color of the cake icon is changed in response to the selection of the cake icon.

<Regarding Display Priority>

The second display control unit 210 determines the display priority of information on the products displayed on the display device 10. There are various determination methods. For example, the second display control unit 210 sets the higher display priority of information on the product in the order of earliness of read-out from the product information storage device. In another example, the second display control unit 210 may determine the display priority of information on respective products based on the product ID, the product name, the last display date and time, the display frequency, or the like. The method of determining the display priority based on the product ID or the like has been described in the first example embodiment.

Also, suppose that the category determining unit 202 also determines the category of the second layer related to the keyword when the keyword is input. In this case, the second display control unit 210 may set the higher display priority to information on the products belonging to the determined category of the second layer than the display priority of information on the other products, similarly to the first display control unit 204 of the first example embodiment.

Figure 26:
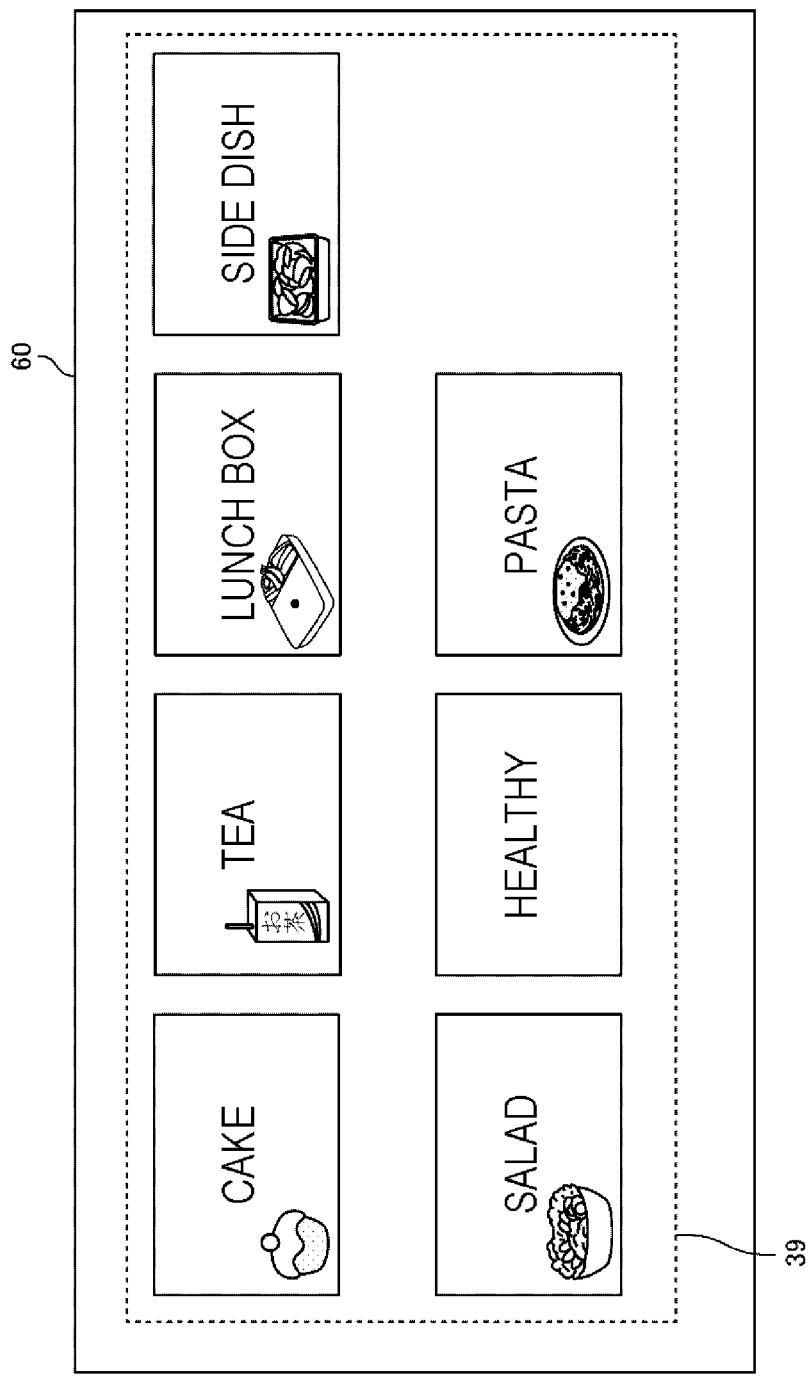
FIG. 26 is a diagram illustrating another way of display of a second category area.

A way of display of the second category area 39 is not limited to ways shown in FIG. 23 and the like. FIG. 26 is a diagram illustrating another way of display of the second category area 39. The window 60 is a window displayed on the display device 10 in response to the input of a keyword. In the second category area 39 of the window 60, the icons of the categories of the first layer related to the input keyword are displayed, similarly to the second category area 39 of the window 30. However, the window 60 does not include the product name area 32, the detailed area 34, and the like.

In a case where one of the icons is selected in the window 60, the window displayed on the display device 10 is changed. The window after the change may be a certain window including information on products belonging to the category determined by the selected icon.

Figure 27:
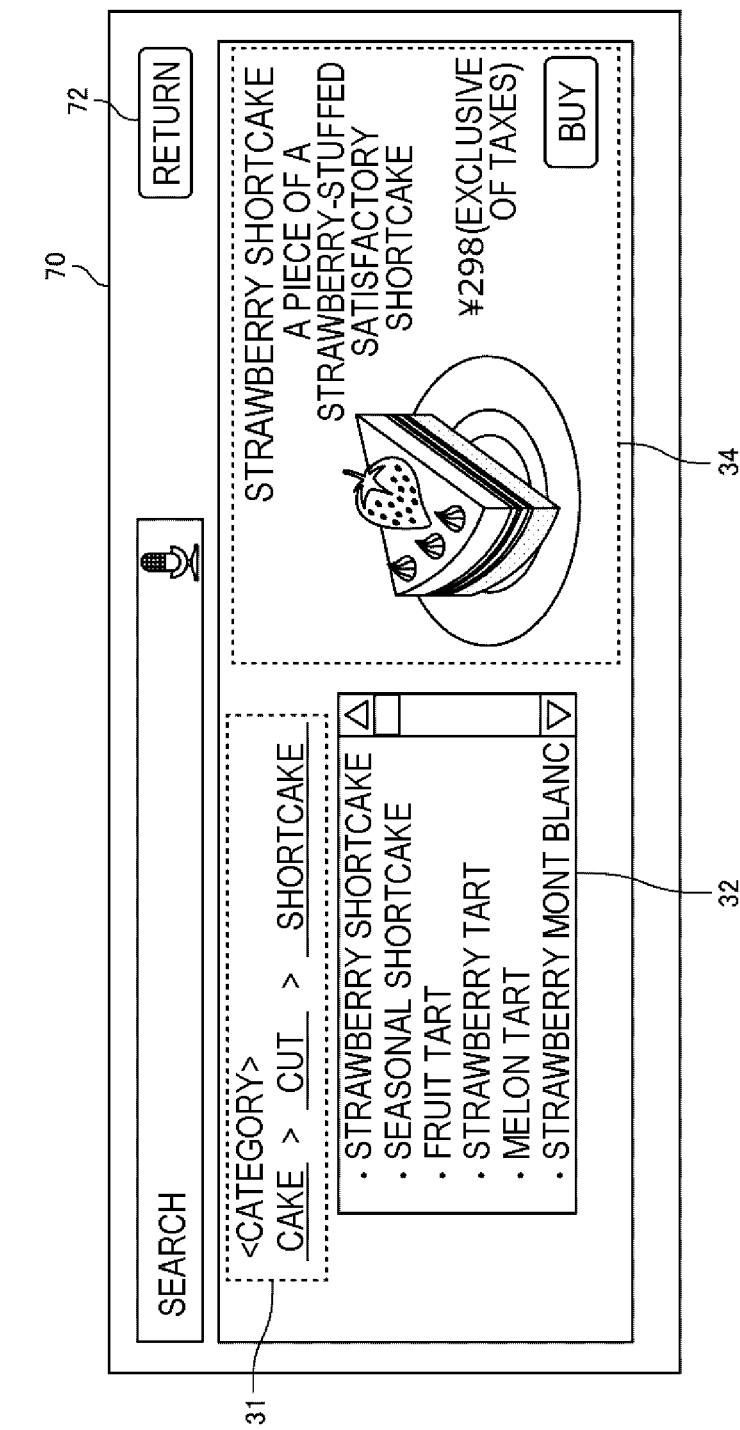
FIG. 27 is a diagram illustrating a window displayed in response to the selection of the cake icon.

FIG. 27 is a diagram illustrating a window 70 displayed in response to the selection of the cake icon in the window 60. Except for a button 72, the contents of the window 70 are the same as the contents of the window 30 in FIG. 9. The button 72 is a button for returning from the window 70 to the window 60. In a case where the button 72 is pressed, the window displayed on the display device 10 is changed to the window 60.

<Hardware Configuration Example>

The information processing apparatus 200 of the fifth example embodiment is implemented by using the computer 100, similarly to the information processing apparatus 200 of the fourth example embodiment (see FIG. 3). In the example embodiment, each program module stored in the storage device 108 described above includes a program for implementing each function of the information processing apparatus 200 according to the example embodiment.

According to the information processing apparatus 200 of the example embodiment, the specification information of the category of the first layer related to the keyword is displayed on the display device 10. On the other hand, the information on the products belonging to that category is displayed on the display device 10 only after the specification information of that category is selected. Therefore, the display according to the input of the keyword becomes simple, as compared with a case where the information on the products is automatically displayed on the display device 10 according to the input of the keyword. Therefore, the processing load of the information processing apparatus 200 is reduced.

Sixth Example Embodiment

Figure 28:
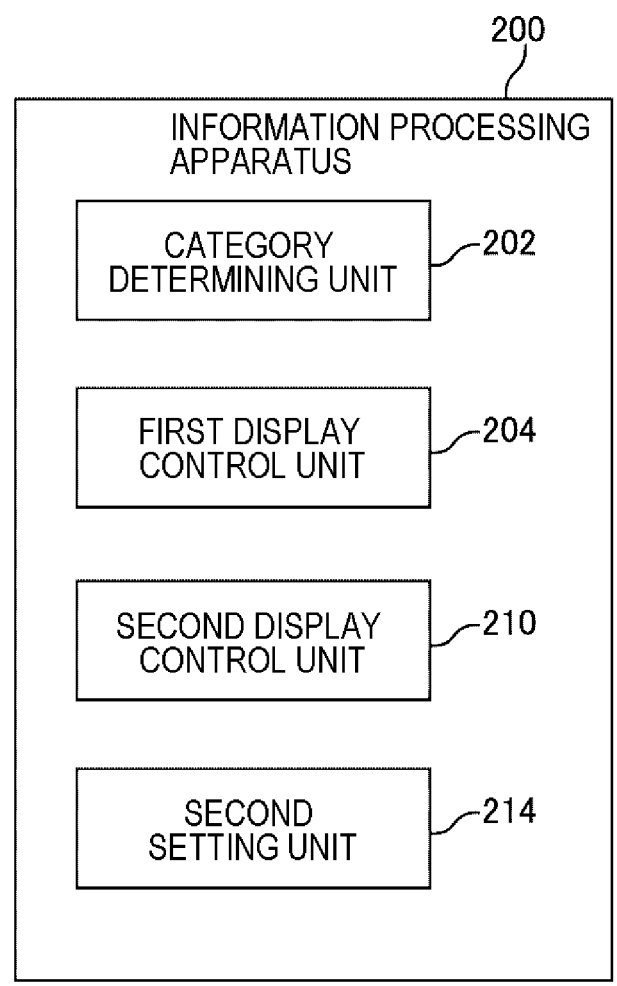
FIG. 28 is a block diagram illustrating an information processing apparatus according to a sixth example embodiment.

FIG. 28 is a block diagram illustrating the information processing apparatus 200 according to the sixth example embodiment. Except for the points described below, the information processing apparatus 200 of the sixth example embodiment has the same function as the information processing apparatus 200 of the fourth and fifth example embodiments.

The information processing apparatus 200 according to the sixth example embodiment includes both the first display control unit 204 and the second display control unit 210. However, in the information processing apparatus 200 of the sixth example embodiment, the control of the display device 10 is performed based on the determined category of the first layer by either the first display control unit 204 or the second display control unit 210.

In order to implement this function, the information processing apparatus 200 of the sixth example embodiment has a second setting unit 214. The second setting unit 214 sets the state of the information processing apparatus 200 to any one of a third state and a fourth state according to an input operation of the user.

In a case where the state of the information processing apparatus 200 is the third state, it is the first display control unit 204 that performs the control of the display device 10 based on the category of the first layer determined by the category determining unit 202. On the other hand, in a case where the state of the information processing apparatus 200 is the fourth state, it is the second display control unit 210 that performs the control of the display device 10 based on the category of the first layer determined by the category determining unit 202. Thus, setting of "which of the first display control unit 204 and the second display control unit 210 performs the control of the display device 10 based on the determined category of the first layer" is performed by the second setting unit 214.

An input operation accepted by the second setting unit 214 is arbitrary. For example, the input operation accepted by the second setting unit 214 may be the same as the input operation accepted by the first setting unit 208 of the third example embodiment.

<Hardware Configuration Example>

The information processing apparatus 200 according to the sixth example embodiment is implemented by using the computer 100, similarly to the information processing apparatuses 200 of the first to fifth example embodiments (see FIG. 3). In the example embodiment, each program module stored in the storage device 108 described above includes a program for implementing each function of the information processing apparatus 200 according to the example embodiment.

According to the information processing apparatus 200 of the example embodiment, the control of the display device 10 is performed based on the determined category of the first layer by either the first display control unit 204 or the second display control unit 210. Then, it is determined which of the first display control unit 204 and the second display control unit 210 performs the control of the display device 10, by an input operation of the user. Therefore, the user may set which information is displayed on the display device 10 when a keyword is input. Therefore, it is possible to appropriately use the information processing apparatus 200 according to the usage environment of the information processing apparatus 200.

Although the example embodiments of the present invention have been described with reference to the drawings, these are examples of the present invention, and combinations of the example embodiments or various configurations other than the above may also be adopted.

This application claims priority based on Japanese Patent Application No. 2016-161992 filed on Aug. 22, 2016, the disclosure of which is incorporated herein in its entirety.

The invention claimed is:

1. An information processing apparatus comprising:
a memory configured to store instructions; and
a processor configured to execute the instructions to:
  determine a category of a first layer and a category of a second layer related to a first keyword by using category information indicating hierarchical categories and the first keyword that is input, the second layer being a layer lower than the first layer;
  acquire information on a first product and a second product each belonging to the determined category of the first layer, the first product not belonging to the determined category of the second layer and the second product belonging to the determined category of the second layer;
  cause, based on determining the category of the first layer and the category of the second layer related to the first keyword, a display device to display the acquired information on the second product at a higher priority than the acquired information on the first product, and to also display the acquired information on the first product at a lower priority than the acquired information on the second product;
  set a state of the information processing apparatus to a first state in response to an input indicating the first state;
  set the state of the information processing apparatus to a second state in response to the input indicating the second state, the second state being a state in which processing of acquiring the keyword is not performed; and
  perform determining of the category related to the keyword in a case where the state of the information processing apparatus is the first state,
  wherein the input is accepted according to input operation on a toggle button, and
  wherein the second state is a state in which determining of the category related to the keyword is not performed.

2. The information processing apparatus according to claim 1,
wherein the processor is further configured to:
  determine a category of a first layer, a category of a second layer, and a category of a third layer related to a second keyword that is input after the first keyword, the third layer being a layer lower than the second layer related to the second keyword, and
  set a higher priority of display to information on a product belonging to the determined category of the third layer than the priority of display of information on the product, excluding the specified information, among information on the product belonging to the determined category of the second layer related to the second keyword, in a case where it is determined that the categories of the first layer and the second layer related to the second keyword are respectively the same as the categories of the first layer and the second layer related to the first keyword.

3. The information processing apparatus according to claim 1, wherein the keyword is input by voice.

4. The information processing apparatus according to claim 1
wherein the processor is further configured to:
  cause the display device to display specification information of the determined category of the first layer;
  set the state of the information processing apparatus to either a third state or a fourth state;
  cause the display device to display the information on at least one of the first product and the second product belonging to the determined category of the first layer, in a case where the state of the information processing apparatus is the third state; and
  cause the display device to display the specification information of the determined category of the first layer, in a case where the state of the information processing apparatus is the fourth state.

5. The information processing apparatus according to claim 4,
wherein the processor is further configured to cause the display device to display the specification information of the determined category of the first layer at a higher priority than other specification information of other categories of the first layer which have already been displayed on the display device.

6. The information processing apparatus according to claim 1,
wherein causing the display device to display information belonging to the category of the second layer determined based on the first keyword at the higher priority than information on the other product comprises displaying the information on the other product in a list format below information belonging to the category of the second layer.

7. A control method executed by a computer, comprising:
determining a category of a first layer and a category of a second layer related to a first keyword by using category information indicating hierarchical categories and the first keyword that is input, the second layer being a layer lower than the first layer;
acquiring information on a first product and a second product each belonging to the determined category of the first layer, the first product not belonging to the determined category of the second layer and the second product belonging to the determined category of the second layer;
causing, based on determining the category of the first layer and the category of the second layer related to the first keyword, a display device to display the acquired information on the second product at a higher priority than the acquired information on the first product, and to also display the acquired information on the first product at a lower priority than the acquired information on the second product;
receiving an input indicating a first state;
set a state of an information processing apparatus to the first state in response to the input indicating the first state;
perform determining of the category related to the keyword in a case where the state of the information processing apparatus is the first state;
receiving an input indicating a second state; and
set the state of the information processing apparatus to a second state in response to the input indicating the second state, the second state being a state in which processing of acquiring the keyword is not performed, wherein the input indicating the first state and the input indicating the second state are accepted according to input operation on a toggle button, and wherein the second state is a state in which determining of the category related to the keyword is not performed.

8. A non-transitory computer-readable storage medium storing a program that causes a computer to execute:

determining a category of a first layer and a category of a second layer related to a first keyword by using category information indicating hierarchical categories and the first keyword that is input, the second layer being a layer lower than the first layer;

acquiring information on a first product and a second product each belonging to the determined category of the first layer, the first product not belonging to the determined category of the second layer and the second product belonging to the determined category of the second layer;

causing, based on determining the category of the first layer and the category of the second layer related to the first keyword, a display device to display the acquired information on the second product at a higher priority than the acquired information on the first product, and to also display the acquired information on the first product at a lower priority than the acquired information on the second product;

set a state of the information processing apparatus to a first state in response to an input indicating the first state;

set the state of the information processing apparatus to a second state in response to the input indicating the second state, the second state being a state in which processing of acquiring the keyword is not performed; and perform determining of the category related to the keyword in a case where the state of the information processing apparatus is the first state, wherein the input is accepted according to input operation on a toggle button, and wherein the second state is a state in which determining of the category related to the keyword is not performed.

* * * * *